United States Patent
Enick

(10) Patent No.: US 10,876,041 B2
(45) Date of Patent: Dec. 29, 2020

(54) CARBON DIOXIDE AND POLYMER COMPOSITIONS FOR PERMEABILITY CONTROL AND SEALING

(71) Applicant: University of Pittsburgh—Of the Commonwealth System of Higher Education, Pittsburgh, PA (US)

(72) Inventor: Robert M. Enick, Bethel Park, PA (US)

(73) Assignee: University of Pittsburgh—Of the Commonwealth System of Higher Education, Pittsburgh, PA (US)

(*) Notice: Subject to any disclaimer, the term of this patent is extended or adjusted under 35 U.S.C. 154(b) by 33 days.

(21) Appl. No.: 16/382,959

(22) Filed: Apr. 12, 2019

(65) Prior Publication Data

US 2019/0316029 A1    Oct. 17, 2019

Related U.S. Application Data

(60) Provisional application No. 62/657,331, filed on Apr. 13, 2018.

(51) Int. Cl.
*E21B 33/13* (2006.01)
*C09K 8/42* (2006.01)
*C09K 8/594* (2006.01)
*C09K 8/487* (2006.01)
*C09K 8/588* (2006.01)
(Continued)

(52) U.S. Cl.
CPC .............. *C09K 8/594* (2013.01); *C09K 8/487* (2013.01); *C09K 8/588* (2013.01); *C08F 120/24* (2013.01); *C08F 220/24* (2013.01)

(58) Field of Classification Search
CPC .......... E21B 33/13; E21B 33/14; C09K 8/42; C09K 8/50; C09K 8/46; C09K 8/467
See application file for complete search history.

(56) References Cited

U.S. PATENT DOCUMENTS 5,216,097 A * 6/1993 Allewaert ........... C04B 41/4846
                                                        526/243
5,344,956 A    9/1994 Allewaert
(Continued)

FOREIGN PATENT DOCUMENTS

WO    WO2016053237 A1    4/2016

OTHER PUBLICATIONS

Matyjaszewski, K., Controlled Radical Polymerization; ACS Symposium Series 768, 1998, Chapter 1 pp. 2-30, Chapter 16 pp. 258-283.
(Continued)

*Primary Examiner* — Kenneth L Thompson
(74) *Attorney, Agent, or Firm* — Bartony & Associates, LLC

(57) ABSTRACT

A method of treating a material to achieve at least one of reducing surface wettability of the material or reducing fluid transport through the material includes exposing the material to a composition including a solution of a polymer portion and carbon dioxide for a period of time. The polymer portion includes at least one of a polyfluoroacrylate or a copolymer of a fluoroacrylate and a comonomer. A pressure of the composition is maintained above the cloud point of the polymer portion at a concentration thereof in the carbon dioxide for the period of time.

24 Claims, 9 Drawing Sheets

(51) Int. Cl.
   C08F 220/24   (2006.01)
   C08F 120/24   (2006.01)

(56) References Cited

U.S. PATENT DOCUMENTS

| | | | | |
|---|---|---|---|---|
| 5,863,612 A * | 1/1999 | DeSimone | ............. | B05D 1/025 427/385.5 |
| 6,767,626 B2 | 7/2004 | Tuminello | | |
| 10,508,228 B2 * | 12/2019 | Scharmach | ............. | C09K 8/62 |

OTHER PUBLICATIONS

Matyjaszewski, K. Controlled/Living Radical Polymerization. Progress in ATRP, NMP, and RAFT, ACS Symposium Series 768, 2000, Chapter 1 pp. 1-26, Chapter 24 pp. 347-360 and Chapter 25 pp. 361-371.

Davis, K. A.; Matyjaszewski, K., Statistical, Gradient, Block, and Graft Copolymers by Controlled/Living Radical Polymerizations, Adv. Polym. Sci. 2002, 159, 1-168.

Qiu, J.; Charleux, B.; Matyjaszewski, K., Controlled/living radical polymerization in aqueous media: homogeneous and heterogeneous systems, Prog. Polym. Sci. 2001, 26, 2083-2134.

Ashare, Edward et al, Falling Cylinder Viscometer for Non-Newtonian Fluids, A.I.Ch.E. Journal, vol. 11, No. 5, Sep. 1965, 910-916.

Chvvis, R. W et al.; Pressure-Activated Sealant Economically Repairs Casing Leaks on Prudhoe Bay Wells; Society of Petroleum Engineers, (2009), SPE 120978, 1-11.

Carey, Bill; Wellbore Integrity and CO2 Sequestration; Los Alamos National Laboratory (2010); 1-31.

Xu, Jlanhang et al, Thickening Carbon Dioxide with the Fluorocrylate-Styrene Copolymner, SPE Journal, Jun. 2003, 85-91.

Dahl, J. et al; Uses of Small Particle Size Cement in Water and Hydrocarbon Base Slurries; Journal of Canadian Petroleum Technology, (1993), 32(9), 25-27.

Doherty, Mark D. et al; Small Molecule Cyclic Amide and Urea Based Thickeners for Organic and sc-CO2/Organic Solutions; Energy Fuels (2016), 30, 5601-5610.

Engelke, B. et al; CO2 Self-Healing and Resistant Cement Technology from Laboratory to the Field; SPE/IADC-184641-MS (2017), 1-10.

Huang, Zhihua et al., Enhancement of the Viscosity of Carbon Dioxide Using Styrene/Fluoroacrylate Copolymers; Macromolecules (2000), 33, 5437-5442.

Desimore, J.M. et al., Synthesis of Fluoropolymers in Supercritical Carbon Dioxide; Science, 1992,257 (14), 945-947.

Hong, Lei et al., Global phase behavior for CO2-philic solids: the CO2+Beta-D-maltose octaacetate system, J. of Supercritical Fluids, 34 (2005), 11-16.

Wildenborg, Ton et al., Genetic failure models for well integrity under exposure to CO2, Global CCS Institute, (2017), 1-100.

Jones, P. J. et al., Unconventional remediation in the utica shale using advanced resin technologies, Society of Petroleum Engineers, SPE 165699 (2013), 1-6.

Mawson, Simon et al., Formation of poly(1,1,2,2-tetrahydroperfluorodecyl acrylate) submicron fibres and particles from supercritical carbon dioxide solutions; Mactomolecules (1995), 28,3182-3191.

Miller, Matthew B. et al., Solid CO2-philes as potential phase-change physical solvents for CO2; J. of Supercritical Fluid 61 (2012) 212-220.

Jones, P.J. et al., Rigless operation to restore wellbore integrity using synthetic-based resin sealants; Society of Petroleum Engineers, SPE 167759 (2014), 1-9.

Luna-Barcenas, Gabriel et al., Phase behavior of poly(1,1-dihydroperfluorooctylacrylate) in supercritical carbon dioxide; Fluid Phase Equilibria 146 (1998) 325-337.

McClain, J. B. et al., Characterization of polymers and amphiphiles in supercritical CO2using small angle neutron scatteringand viscometry; Science and Engineering,vol. 74, 1996, 234-235.

Memon, Khalil Rehman et al., Durability and rheological evaluation of cement slurries from atmospheric to high thermal condition; Journal of Applied Scienes 14 (11): 1204-1209,2014.

Morris, Kay A. et al., Resin-based cement alternatives for deepwater well construction; Society of Petroleum Engineers, SPE 155613 (2012), 1-7.

Odiete, William E. et al., Modeling the flow behavior of cement slurry with temperature; int. J. Curr. Sc. 2015, 14: E 70-73.

Oil & Gas Technology, pressure-activated sealants, Sep. 11, 2006, 28-31.

Rusch, D., et al; .; Use of Pressure Activated Sealants to Cure Sources of Casing Pressure; Society of Petroleum Engineers, SPE 55996, SPE Western regional Meeting, May 26-28, 1999, 1-6.

Rusch, D., et al; Microannulus leaks repaired with pressure-activates sealant; Society of Petroleum Engineers, SPE 91399; SPE Eastern Regional Meeting Sep. 15-17, 2004, 1-7.

Rusch D. et al; Annulus communications eliminated using pressure-activated sealant; Spring Conf of the Soln Mining Research Inst, Apr. 17-20, 2005, Syracuse, NY, 1-11.

Shen, Z. et al., CO2-solubility of oligomers and polymers that contain the carbonyl group; Polymer 44, 2003, 1491-1498.

Shahriar, Anjuman et al., Rheological properties of oil well cement slurries; Construction Materials 165(1) 25-44, Feb. 2012.

Offshore Source article; Apr. 2006, p. 30.

Poston, T.; Commell, K.; Daikin America, Inc presentation, Oct. 2013, 1-23.

Rusch, D., et al; Internal repair of pipeline leaks using pressure-activates sealeant; Society of Petroleum Engineers, SPE 91400, SPE Eastern Regional Meeting, Sep. 15-17, 2004, 1-9.

Rusch, D.,Subsea leaks cured with pressure-activated sealant; Society of Petroleum Engineers, SPE SPE 88566, SPE Asia Pacific Oil and Gas Conference, Oct. 18-20, 2004, 1-7.

Russell, Mark H., et al., Investigation of biodegradation potential of a fluoroacrylate polymer product in aerobic soils; Environmental Science & Technology, 2008, 42, 800-807.

Shahriar, Anjuman; PhD thesis, Univ. of Western Ontario, 2011, 1-251.

Al Al Yousef, Zuhair Ali; Study of CO2 Mobility Control in Heterogeneous Media Using CO2 Thickening Agents, MS thesis, Texas A&M University, Aug. 20121, 1-144.

Bae, J.H., et al., A Laboratory Investigation of Viscosified CO2 Process, SPE 20467 (Sep. 1990) published as SPE Advanced Technology Series, vol. 1, No. 1, Apr. 1993, pp. 166-171.

Blasing, Andre at al., Effect of Concentration and degree of saturation on RESS of a CO2-soluble fluoropolymer; Ind. Eng. Chem. Res., 2002, 41, 4976-4983.

Cai, S.; Study of CO2 Mobility Control Using Cross-Linked Gel Conformance Control and CO2 Viscosifiers in Heterogeneous Media, MS Thesis, Texas A&M University, Aug. 2010; 1-152.

Dhwe, Aman et al., Assessment of solubility and viscosity of ultra-high molecular weight polymeric thickeners in etahne, propane and butane for miscible EOR; J of Pet Sc and Eng, IF 1.1, 145 (2016) 266-278.

Teodoriu, Catalin et al., Wellbore integrity and cement failure at HPHT conditions; Int J Eng Ap Sc, 2013,2(2) 1-13.

Teixeira, G. T. et al., New material for wellbore strengthening and fluid losses mitigation in deepwater drilling scenario; Society of Petroleum Engineers, PE-170266-MS, 2014, 1-12.

Urdaneta, J.A. et al., Novel gas shutoff resin system for well abandonment application in Colombia: A case History; SPE 169400, SPEW Latin American and Caribbean Petroleum Engineering Conference May 21-23, 2014 ; 1-7.

Washington, John W. et al., Characterizing Fluorotelomer and Polyiluoroalkyl Substances in New and Aged Fluorotelomer-Based Polymers for Degradation Studies with GC/MS and LC/MS/MS; Environ. Sci. Technol. 2014, 48, 5762-5769.

Washington, John W. et al.,Degradability of an Acrylate-Linked, Fluorotelomer Polymer in Soil; Environ. Sci. Technol. 2009, 43, 6617-6623.

(56) References Cited

OTHER PUBLICATIONS

Washington, John W.; Response to Comments on Degradability of an Acrylate-Linked, Fluorotelomer Polymer in Soil; Environmental Science and Technology 44(2):849-50.
Washington, John W. et al.; Decades-scale degradation of commercial, side-chain, fluorotelomer-based polymers in soils and water; Env. Science & Technology, 2015, 49, 915-923.
Washington, John W. et al.; Abiotic hydrolysis of fluorotelomer-based polymers as a soure of perfluorocarboxylates at the global scale; Environmental Science & Technology, 2015, 49, 14129-14135.
Zhang, D.; Numerical simulation of the effects of slurry properties on displacement efficiency; Advances in Petroleum Exploration and Development, 8(2) 2014, 29-32.
McHugh, M et al., Solid solubilities of naphthalene and biphenyl in supercritical carbon dioxide; J. Chem. Eng. Data, vol. 25, No. 4, 1980-326-329.
Foianibi, I. et al., Cement evaluation behind thicck-walled casing with advanced ultrasonic pulse-echo technology: pushing the limit; SPWLA 54th Annual Logging Symposium, Jun. 22-26, 2013; 1-9.
Matyjaszewski, K., Ed. Controlled Radical Polymerization; ACS: Washington, D. C., 2015, 1-17.

\* cited by examiner

CARBON DIOXIDE AND POLYMER COMPOSITIONS FOR PERMEABILITY CONTROL AND SEALING

CROSS-REFERENCE TO RELATED APPLICATIONS

This application claims benefit of U.S. Provisional Patent Application Ser. No. 62/657,331, filed Apr. 13, 2018, the disclosure of which is incorporated herein by reference.

GOVERNMENTAL INTEREST

This invention was made with government support under grant no. DE-FE0010799 awarded by the US Department of Energy. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

In many situation, it may be desirable to change the surface properties (for example, surface energy or wettability) and/or fluid transport properties of a material or medium (for example, a porous medium, a permeable medium and/or other medium). It may, for example, be desirable to change the surface properties of the porous or permeable medium to induce hydrophobicity, oleophobicity or multiphobicity. Moreover, it may be desirable to reduce the fluid transport properties (for example, by reducing leakage, porosity or permeability) of the material of medium.

In subterranean hydrocarbon recovery, there are many instances in which it is desirable to alter the nature of a subterranean material. The subterranean material may have been added in various processes (for example, cement added for wellbore integrity) or the material may be a natural formation (for example, a subterranean rock formation or strata). Oil and gas wells may, for example, experience flooding fluid breakthrough problems as the result of the presence of a "thief zone" having high absolute permeability. Layers penetrated by water/$CO_2$ may be called "thief zones" because they draw off large quantities of water/$CO_2$ and thereby impair the economics of a flood operation. A thief zone may, for example, be defined as a relatively thin layer comprising 5% or less of the net pay thickness and taking more than 25% of the injected flooding fluid in a given well. Thief zones, also be called "super permeability" zones or "speed zones," may also be defined as laterally continuous stratigraphic unit of relatively high permeability and large pore radius, which have approached residual oil saturation. Preferentially reducing the permeability of such thief zones would be highly desirable in hydrocarbon recovery.

Moreover, in oil and gas wells, the integrity of a wellbore must be maintained to prevent undesirable and dangerous leaks of oil or gas into the environment. Cracks in injected cement that resides between the outside of the steel casing and the surface of the rock (through which the well was drilled) can, for example, diminish wellbore integrity and provide passages for leaks of oil or gas. These cracks can be within the cement itself, between the steel surface and the cement, or between the rock and the cement. There are at least three types of injectable fluids that have been designed to seal such cracks, including cement ("cement squeezes"), solids-free resin (polymer) squeezes, and water-based coagulating emulsions. However, the success achieved with such fluids is somewhat limited, particularly in the case of very small openings or passages.

SUMMARY

In one aspect, a method of treating a material to achieve at least one of reducing surface wettability of the material or reducing fluid transport through the material includes exposing the material to a composition including a solution of a polymer portion and carbon dioxide for a period of time. The polymer portion includes at least one of a polyfluoroacrylate or a copolymer of a fluoroacrylate and a comonomer. A pressure of the composition is maintained above the cloud point of the polymer portion at a concentration thereof in the carbon dioxide for the period of time. In a number of embodiments, the cloud point is no more than 5000 psi, not more than 3000 psi, not more than 2000 psi, not more than 1500 psi, no more than 1450 psi or no more than 1400 psi at the temperature of operation (for example, at 25° C.).

In a number of embodiments, the comonomer is present in the copolymer up to 50 mole %, up to 40 mole % or up to 25 mole %. The comonomer may, for example, be an alkyl acrylate ($CH_2$=CHCOOR, wherein R is an alkyl group), an alkyl methacrylate ($H_2C$=$C(CH_3)$—$COOR^1$ is an alkyl group), styrene, benzyl acrylate, phenyl acrylate, napthyl acrylate or a mixture of two or more thereof. In a number of embodiments, R and $R^1$ are independently a $C_1$ through $C_{30}$ alkyl group. Alkyl group can be branched or unbranched, acyclic or cyclic. Representative examples of alkyl acrylates include, but are not limited to, methylacrylate, ethylacrylate, propylacrylate, butylacrylate, pentylacrylate, cyclohexyl acrylate and lauryl acrylate, or a mixture thereof.

In a number of embodiments, the polymer portion consists of polyfluoroacrylates. The concentration of the polyfluoroacrylates in the carbon dioxide may, for example, be in the range of 0.01% to 20 wt %, 0.01 to 16%, 0.01 to 8%, or 0.5 to 2%. In the case that the polymer portion consist of polyfluoroacrylates, the cloud point may, for example, be no more than 2000 psi, no more than 1500 psi, no more than 1450 psi or no more than 1400 psi.

The material may, for example, include a cement. In a number of embodiments, the cement is present in a well bore used in a hydrocarbon recovery process. The cement may, for example, be positioned outside a well casing in the well bore. In a number of embodiments, the method further includes isolating the cement to be treated (for example, from greater depths in the well bore) before exposing the cement to the composition.

The material may also, for example, be a subterraneous formation. In a number of embodiments, the composition is used for conformance control. The composition may, for example, be selectively injected into a high-permeability zone of a subterraneous formation. In a number of other embodiments, the composition is used for reducing fluid transport through at least a portion of a subterraneous formation subsequent to injection of carbon dioxide for sequestration of the carbon dioxide in the subterraneous formation.

In another aspect, system for treating a material to achieve at least one of reducing surface wettability of the material or reducing fluid transport through the material includes a container including a solution of polymer portion and carbon dioxide. The polymer portion includes at least one of a polyfluoroacrylate or a copolymer of a fluoroacrylate and a comonomer. The container includes an outlet from which the composition is injected. The system and a pressurizing mechanism to inject the solution from the outlet of the container at a pressure above the cloud point of the polymer portion. The polymer portion may, for example, be further characterized as described above.

In a number of embodiments, the system further includes an isolating system to limit the flow of the composition to a predetermined volume during injection of the composition into a well bore. The isolating system may, for example, include straddle packer system. The polymer may, for example, be delivered through a conduit such as a coiled conduit through a first isolation unit to a volume to be treated. As second isolation unit (spaced from the first isolation unit, wherein the volume is positioned between the first and second isolation units) may, for example, isolate the volume from the volume of the well at greater depth than the second isolation unit. The pressurizing mechanism may, for example, include source of pressurized gas (for example, carbon dioxide) which is pumped into the container via an inlet thereof or a mechanical pressurizing mechanism within the container.

In another aspect, a method of treating a material to achieve at least one of reducing surface wettability of the material or reducing fluid transport through the material includes exposing the material to a composition including a solution of a polymer portion which is oleophobic, hydrophobic or multiphobic and carbon dioxide for a period of time, wherein a pressure of the composition is maintained above the cloud point of polymer portion at a concentration thereof in the carbon dioxide for the period of time. The polymer portion may, for example, include at least one of a polyvinyl acetate, a polydimethyl siloxane, a polyfluoroacrylate, and a copolymer of fluoroacrylate and a comonomer. In a number of embodiments, the cloud point is no more than 5000 psi, no more than 3000 psi, no more than 2000 psi, no more than 1500 psi, no more than 1450 psi or no more than 1400 psi.

The present systems, methods and compositions, along with the attributes and attendant advantages thereof, will best be appreciated and understood in view of the following detailed description taken in conjunction with the accompanying drawings.

DETAILED DESCRIPTION

Figure 1:
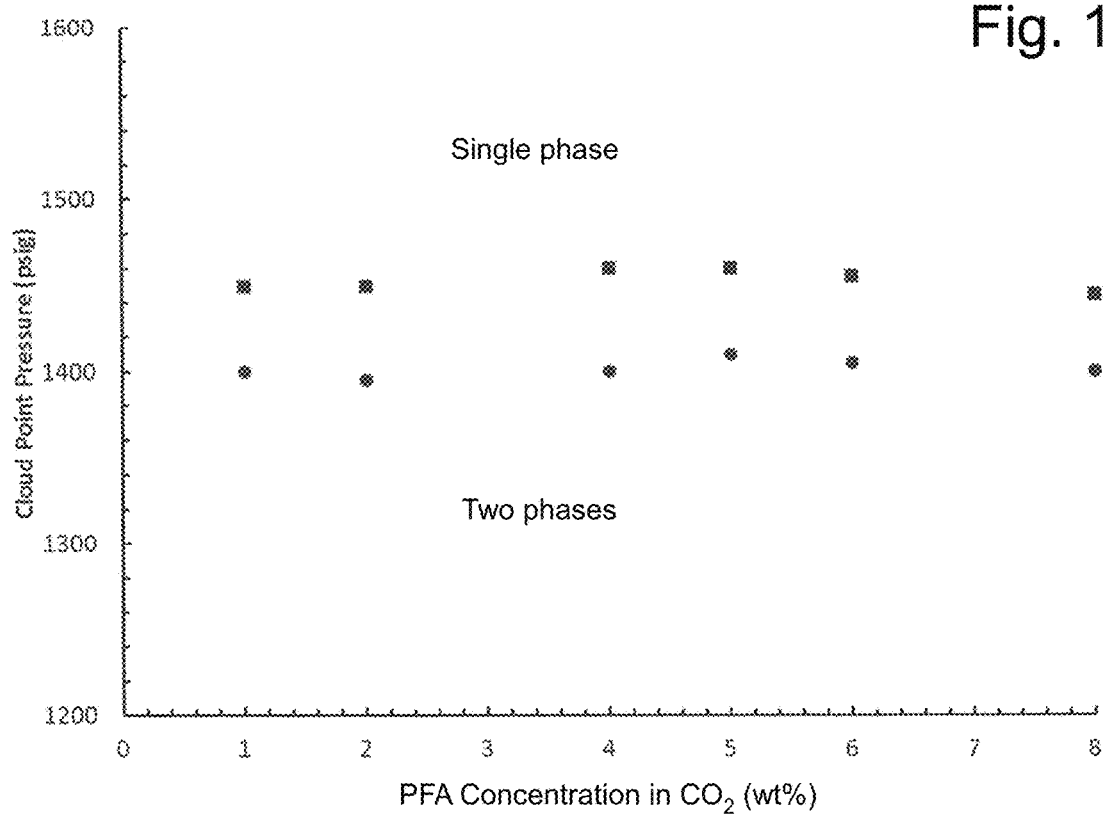
FIG. 1 illustrates PFA solubility in $CO_2$ at 24° C. for two high molecular weight PFA samples.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a multiphobic polymer" includes a plurality of such multiphobic polymers and equivalents thereof known to those skilled in the art, and so forth, and reference to "the multiphobic polymer" is a reference to one or more such multiphobic and equivalents thereof known to those skilled in the art, and so forth. Recitation of ranges of values herein are merely intended to serve as a shorthand method of referring individually to each separate value falling within the range. Unless otherwise indicated herein, each separate value as well as intermediate ranges are incorporated into the specification as if it were individually recited herein. All methods described herein can be performed in any suitable order unless otherwise indicated herein or otherwise clearly contraindicated by the text.

In a number of embodiments, devices, systems, methods and compositions hereof provide for changing surface energy/wettability characteristics (that is, increasing hydrophobicity and/or oleophobicity) and/or changing fluid transfer properties (for example, reducing leakiness, porosity, and/or permeability) of a material. The compositions hereof may, for example, be applied under pressure to the material. In general, the compositions are applied at a pressure above the cloud point of a polymer solubilized in carbon dioxide or $CO_2$ (for a given polymer concentration and temperature). In a number of embodiments, the compositions include carbon dioxide and a polymer solubilized in the carbon dioxide. The polymer may, for example, be oleophobic, hydrophobic or multiphobic. In a number of embodiments, the polymer is multiphobic. In a number of embodiments, the multiphobic polymer solubilized in carbon dioxide is a polyfluoroacrylate. In a number of embodiments, the pressure of the composition hereof is at least 1400 or 1450 psi.

A number of polymeric materials are oilphobic or oleophobic (oil repellant), hydrophobic (water repellent) or both oleophobic and hydrophobic. Oleophobic materials are, for example, substantially resistant to wetting by or to bulk flow therethrough of low-surface tension liquids such as oils. As used herein, the phrase "low-surface tension liquids" refers generally to liquids having a surface tension less than that of water. Hydrophobic materials are, for example, substantially resistant to wetting by or to bulk flow therethrough of water or aqueous compositions. Materials that are both hydrophobic and oleophobic are referred to as "multiphobic" herein.

Compositions including carbon dioxide ($CO_2$) and a polymeric fluoroacrylate material soluble in carbon dioxide, which is oleophobic, hydrophobic or multiphobic, have been found to provide low-viscosity compositions for use in, for example, sealing materials from fluid transfer therethrough (for example, from flow therethrough of gases as well as from flow of low-surface-tension liquids, aqueous liquids or both low-surface-tension and aqueous liquids, respectively). Polyfluoroacrylates may, for example, be represented by the formula:

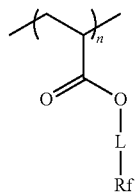

wherein L is a linker or spacer group, which may or may not be present (for example, a $—C_mH_{2m}—$ group wherein m is an integer between 1 and 6), and Rf is a fluorous or fluorine-containing group. As used herein, the term "fluorous", when used in connection with an organic (carbon-containing) molecule, moiety or group, refers generally to an organic molecule, moiety or group having one or more domain or a portion thereof rich in carbon-fluorine bonds (for example, fluorocarbons, fluorohydrocarbons, etc.). The terms "fluorous group" thus refer generally to a group or moiety rich in carbon-fluorine bonds. Such groups may be "perfluorocarbons" which refers generally to organic compounds in which all hydrogen atoms bonded to carbon atoms have been replaced by fluorine atoms. Such groups may also be "fluorohydrocarbons" and "hydrofluorocarbons" which include organic compounds in which not all hydrogen atom bonded to a carbon atom have been replaced by a fluorine atom. In a number of embodiments, Rf is a fluoroaliphatic group. In a number of embodiments, the fluoroaliphatic group has at least 2 or 3 carbon atoms. The fluoroaliphatic group may, for example, include between 2 to 20 carbon atoms, or between 3 to 6 carbon atoms. The Rf group hereof may, for example, have at least 40% by weight fluorine, at least 50% by weight fluorine or at least 70% by weight fluorine. Fluoroacrylate monomers and polymers/copolymers prepared therefrom are, for example, discussed in U.S. Pat. No. 5,344,956, the disclosure of which is incorporated herein by reference. In a number of embodiments Rf is $—C_6F_{13}$. Other polymers suitable for use herein may include, for example, polyvinyl acetates and polydimethylsiloxanes. However, the dissolution of those polymers in $CO_2$ would require much higher pressures than required for the dissolution of polyfluoroacrylates, or would require the addition of an organic co-solvent for example, toluene, hexanes etc.) to the $CO_2$ to promote dissolution of polyvinyl acetates and polydimethylsiloxanes at more reasonable pressures.

The polyfluoroacrylate or PFA $(CHCH_2OCOC_2H_4C_6F_{13})_n$ (which is illustrated below) may be synthesized via the homopolymerization of a $CHCH_2OCOC_2H_4C_6F_{13}$ tridecafluorooctyl acrylate liquid monomer (Mw 418).

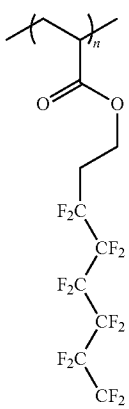

The polymer may, for example, be synthesized in an organic liquid solvent, in high pressure liquid $CO_2$, or by bulk polymerization of the monomer. PFA is extraordinarily $CO_2$ soluble and may be solubilized therein without the use of cosolvents. PFA is, for example, the only polymer known which may dissolve in compressed liquid $CO_2$ or supercritical $CO_2$ at pressures that are commensurate with, for example, oilfield applications. $CO_2$ is a relatively poor solvent in that it can dissolve only a few high molecular weight polymers other than PFA (such as polyvinyl acetate or polydimethyl siloxane). Although polyvinyl acetate and/or polydimethyl siloxane may be used in some embodiments hereof, such polymers dissolve in $CO_2$ only at pressures of 10000 to 40000 psi. Copolymers of fluoroacrylate and other acrylate monomers were also studied. Such polymer provide cloud points lower than those of polyvinyl acetate and/or polydimethyl siloxane. However, solutions including only PFA polymers and carbon dioxide provide the lowest cloud points. No cosolvents are required for solution of polymers of fluoroacrylates in carbon dioxide. Once again, the cloud point of PFA is relatively low at 1400 to 1450 psi. However, PFA is completely insoluble in $CO_2$ vapor or supercritical fluids several hundred psi below the cloud point pressure. Thus, if a $CO_2$-PFA solution experiences low pressures (that is, pressures below the cloud point) the PFA will precipitate.

Because polyfluoroacrylates are susceptible to hydrolysis, the degradation of PFA based on 8 fluorinated carbons in the monomer would lead to the formation of perfluorooctanoic acid (PFOA). In general, it is more environmentally favorable to use monomers having 6 or less fluorinated carbons in forming PFAs for use herein. If a fluoroacrylate based on a 6 fluorinated carbon chain monomer is used, for example, a more environmentally benign perfluorohexanoic acid (PFHXA) product would form if any hydrolysis occurs. Thus, polymers such as PFA synthesized using the —$C_6F_{13}$ fluorinated side chain chemistry enjoy global regulatory approval in a wide variety of applications. They are safe and effective replacements for the older $C_8F_{17}$-based water repellant articles, especially because data in non-human primates indicate that their degradation products such PFHXA have substantially shorter half-lives in these animals than PFOA associated with the $C_8F_{17}$-based polymers. In 2013, the EPA affirmed that compounds containing —$C_6F_{13}$ groups would not be targeted by EPA's 2009 Long-Chain Perfluorocarbon Action Plan Proposal. The more environmentally benign version of the PFA polymer, which contains only 6 fluorinated carbons, was thus used in studies hereof.

Polyfluoroacrylates and fluoroacrylate-containing co-polymers are the most $CO_2$-soluble high-molecular-weight homopolymers identified. Relatively high molecular weights polymers are used in the composition hereof (for example, a weight average Mw of at least 50,000, a weight average of at least Mw of 100,000, or a weight average molecular weight of at least 500,000.) enable viscosity enhancement of $CO_2$. In a number of embodiments, the weight average molecular weight of the polymers hereof is in the range of 50,000 to 5,000,000. Polymers hereof (such as polyfluoroacrylates and fluoroacrylate-containing co-polymers) are capable of dissolving in $CO_2$ at typical enhanced oil recovery or EOR conditions (that is, temperatures ranging from 25° C. to 125° C., minimum and miscibility pressures ranging from 1000-5000 psi) to concentrations of, for example, 0.01 wt % or more without the need for the addition of a co-solvent such as toluene or hexane. In a number of embodiments hereof, PFA or fluoroacrylate copolymers hereof are present in $CO_2$ at a concentration in the range of approximately 0.01 to 20 wt %, approximately 0.01 to 16%, approximately 0.5 to 8 wt %, or approximately 0.5 to 2 wt %. As used herein, the word "approximately" refer to a value within 10% or even within 5% of the stated value or values.

The solubility of PFA in $CO_2$ was determined using standard non-sampling techniques in an agitated, variable-volume, invertible, high pressure view cell (Schlumberger) rated to 10000 psi at 180° C. Known amounts of PFA and $CO_2$ were introduced to the sample volume and agitated for 20 minutes at a constant temperature and very high pressure (approximately 5000 psi) using a magnetically driven slotted-blade impeller. If a single transparent phase is achieved, then the sample volume was slowly expanded using a computer-controlled, positive displacement pump (Schlumberger) until a "cloud point" is observed where small particles or droplets of a polymer-rich phase came out of solution, rendering it "cloudy".

The cloud point pressure results are shown in FIG. 1 for two separate batches of PFA. PFA is remarkably soluble in $CO_2$, requiring only about 1400 to 1450 psi to dissolve up to 8 wt % of PFA in $CO_2$ at 24° C. A single, transparent, stable phase occurs at pressure above the cloud point, while two phase equilibria occurs below the cloud point. There was no evidence of any $CO_2$-soluble impurities in the PFA. Therefore, in sealing and flooding experiments conducted in the studies hereof, pressure within was maintained at values greater than, for example, 1500 psi to ensure that the PFA did not come out of solution as a result of a phase change.

The viscosity of a single phase solution of 1 wt % PFA and 99 wt % $CO_2$ was determined using falling object viscometry. The procedure and the derivation of the expressions for the shear rate for a falling aluminum cylinder are well known. In the studies hereof, a close-clearance aluminum cylinder was placed within the cylindrical sample volume of the Schlumberger variable-volume windowed cell along with the PFA. $CO_2$ was then added to the cell, which was maintained at a constant temperature within an air bath, until the weight ratio of PFA to $CO_2$ was 1:99 (1 wt % PFA). The sample volume was then adjusted to the desired pressure and the $CO_2$ and PFA mixed until a single phase was attained. The cell was rapidly inverted and the terminal velocity of the falling cylinder determined. The corresponding shear rate could then be calculated. This test was repeated with pure $CO_2$, and the ratio of the terminal velocities was used to estimate the solution viscosity under the assumption that the change in fluid density resulting from the dilute amount of PFA was not significant. For example, if the ball fell three times more slowly in the PFA-$CO_2$ solution, then the solution was estimated to be three times as viscous as pure $CO_2$. This process was repeated for a series of cylinders with slightly varying diameter to estimate the effect of shear rate on solution viscosity.

Figure 2:
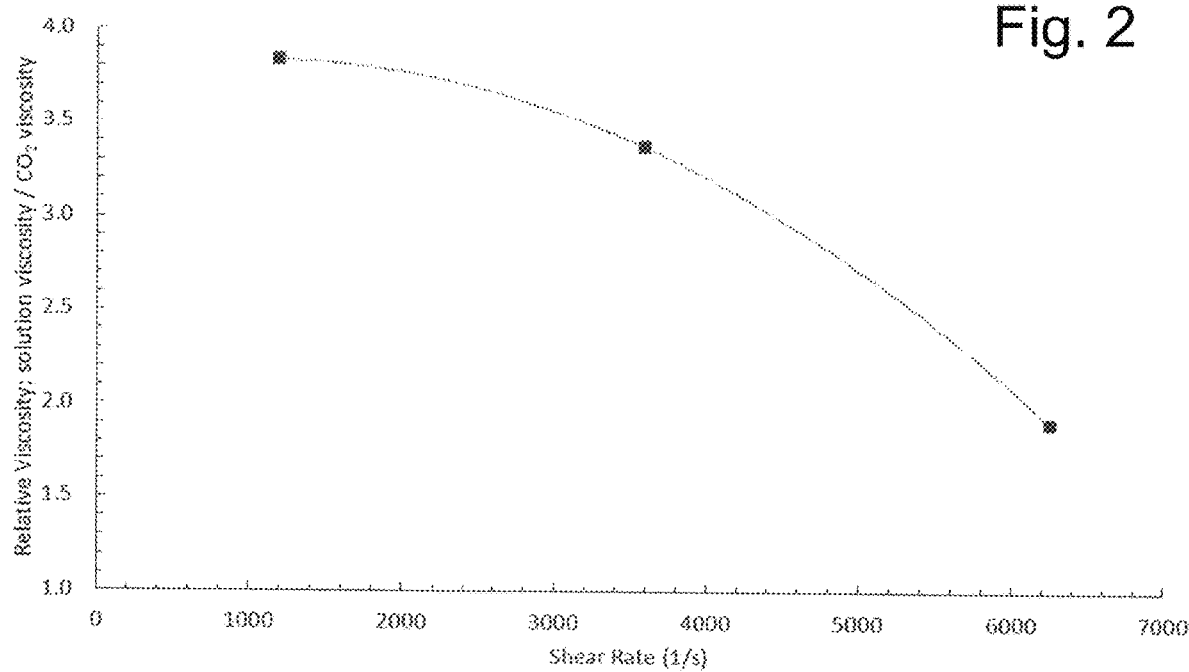
FIG. 2 illustrates falling cylinder viscometry results for a single-phase solution of 1 wt % PFA in $CO_2$ at 24° C. and 3000 psi, demonstrating that the maximum increase in viscosity that can achieved with 1 wt % PFA is a factor of approximately 4 (as the shear rate approaches 0; the composition displays shear thinning behavior).

The results are illustrated in FIG. 2. The data demonstrates that even at the lowest possible shear rates (approaching 0), 1 wt % PFA increases the viscosity of $CO_2$ by a factor of approximately 4. Without limitation to any mechanism, the increase in relative viscosity with increasing pressure is attributed to the ability of $CO_2$ to more fully expand the dissolved polymer coils, thereby increasing the viscosity of the solution. Further increases in viscosity are possible with increasing PFA concentration. In that regard, if one desires to attain a 30-fold increase in viscosity at, for example, 25° C. and 3000 psi (for example, in using PFA as a thickener for $CO_2$), then 5 wt % PFA may be used.

In a number of methods hereof, a material in a well for hydrocarbon recovery is "sealed" by injecting of a composition hereof into the well under pressure. The composition comprises carbon dioxide and a multiphobic polymer such as PFA solubilized in the carbon dioxide. In the case of a PFA polymer, no cosolvents or other components need be added to the composition. In a number of embodiments, a pressure of the composition is above the cloud point for the solution at a particular polymer concentration and temperature (for example, at least 1400 psi of at least 1450 psi at approximately 24° C.). The compositions hereof may, for example, be used to seal cement used in connection with well casings in the hydrocarbon recovery process. The cement may, for example, be positioned outside a well casing.

As described above, the integrity of a wellbore must be maintained to prevent undesirable and dangerous leaks of oil or gas into the environment. Cracks in the cement that resides between the outside of the steel casing and the surface of the rock (through which the well was drilled) can, for example, diminish wellbore integrity and provide passages for leaks of oil and/or gas. If one injects a high pressure, low viscosity, single-phase solution of $CO_2$ and a dilute concentration of high molecular weight multiphobic polymer such as polyfluoroacrylate (PFA) into these cracks, the PFA will adsorb onto the cement and seal the crack. Because the PFA is an extremely sticky, thermally stable, water-repellent and oil-repellent polymer, it provides an excellent barrier to prevent the leak of water, oil or natural gas. Cracks between steel-cement and rock-cement will also be sealed by solution of $CO_2$ and a multiphobic polymer such as PFA.

The composition hereof need not replace other sealing techniques (for example, use of cement, resin, aqueous emulsion). However, because the compositions hereof are orders of magnitude less viscous than the other remediation or sealing treatments, the compositions hereof are well suited for sealing the tiniest of cracks or other openings that can provide problematic leakage pathways (especially for natural gas).

It is believed that is the first report of a low viscosity solution for sealing small openings, pores or cracks in materials (for example, in casing cement). Moreover, this is believed to be the first report of a $CO_2$-based crack sealing technology. Unlike cement, resin and water-based emulsions, the compositions here of have a viscosity dramatically lower than water or oil and comparable to that of natural gas. This low viscosity allows the compositions hereof to enter cracks in materials such as cement that the other solutions have great difficulty penetrating. The compositions hereof have also been found to be stable under the conditions found in subterranean formations for oil recovery.

Every effort is made to carefully place cement in the annulus between the casing and rock formations as the well is being completed. Traditionally, cement is pumped into the annulus between the casing and the rock layers to provide production zone isolation, casing support, and a barrier that prevents produced or injected fluids from migrating into the annulus or into high permeability thief zones. Despite careful placement of cement or cement alternatives, cracks and fractures can still occur. Typically, a cement squeeze is used for remediation of these defects; although well suited for the largest openings, the presence of small particles (1-100 microns) within the cement prevents it from sealing cracks with widths that are comparable in size to the particles. Solids-free epoxy resins (having a viscosity in the range of approximately 100 to 1000 cp when fresh, prior to curing) are better suited for flowing into and sealing smaller cracks. Another option is the use of an emulsion (have a viscosity in the range of approximately 100 to 500 cp) of polymerizing chemicals suspended in a carrier liquid. When such an emulsion is displaced toward a small crack, the carrier fluid passes through the crack while the emulsified droplets accumulate at the crack entrance and polymerize into a seal.

The very low viscosity, $CO_2$-solubilized polymer fluids hereof are suitable for sealing small cracks associated with any type of casing cement. Once again, the $CO_2$ solutions hereof need not replace the cement, resin, or polymerizing emulsions currently used to block leakage pathways in cement, but may provide another tool to ensure wellbore integrity, especially if the cracks/opening are very small, yet sufficiently large to provide a leakage pathways. The high pressure, single-phase, transparent solution of carbon dioxide ($CO_2$) and PFA hereof contain a relatively small amount of completely-dissolved, high-molecular-weight polymer that is amorphous, elastic, sticky, and thermally stable. As described above, PFA is a unique polymer in that it is extremely hydrophobic and oleophobic, yet soluble up to approximately 20 wt % in high pressure $CO_2$. The viscosity of the $CO_2$-PFA solutions containing up to several percent of PFA is in the range of approximately 0.05 to 1.0 cp, which is 100 to 10,000 times less viscous than cement, resin, or polymerizing emulsions. Therefore, $CO_2$-PFA solutions hereof can enter and flow into and through extremely small cracks that are sufficiently large to provide leakage pathways but small enough to hinder the use of traditional sealing approaches. Studies of the $CO_2$-PFA solutions hereof have shown that when the PFA-$CO_2$ flows through, for example, porous rocks or through a crack in cement, the PFA exhibits an extremely strong tendency to adsorb onto surfaces such as cement and rock surfaces. In small cracks, where the ratio of area to volume is high, the adsorption of the polymer can be significant enough to completely seal the crack.

Figure 3:
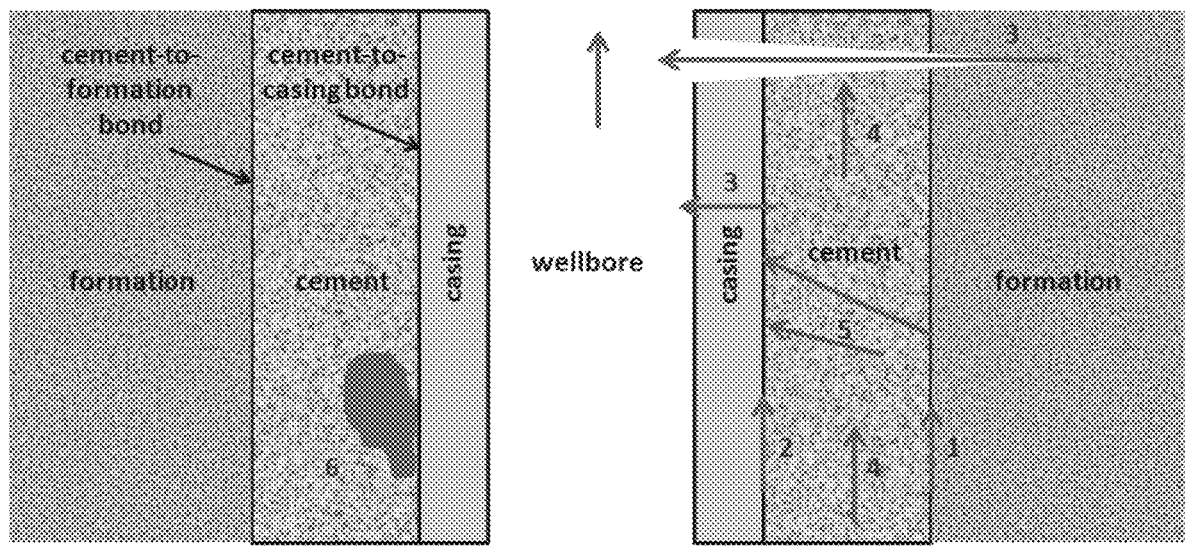
FIG. 3 illustrates a schematic, cross-sectional view of a wellbore and various undesirable fluid transport or flow paths that may arise in the wellbore casing and surrounding cement.

As described above, despite extensive efforts to maintain wellbore integrity, defects can still occur that reduce wellbore integrity as, for example, a result of preproduction problems and stresses associated with injection. Moreover, geochemical-based reactions can result in corrosion of the metal casing and the degradation of the cement. As a result, problematic pathways for the migration of $CO_2$ can form as, for example, illustrated in FIG. 3. In FIG. 3, undesirable flow paths include gaps 1 between the formation and the cement, a micro-annulus 2 between the cement and the outside of the casing, fractures 3 passing through the wall of the casing and into the wellbore, cracks 4 within the cement, radial fractures 5 in the cement that extend to the formation and voids, or pockets 6 where cement did not flow.

Figure 4:
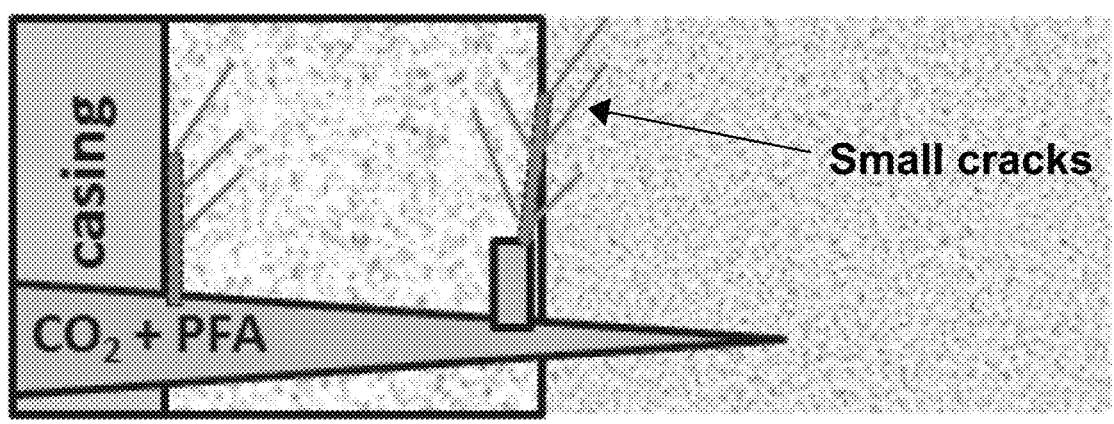
FIG. 4 illustrates the remediation or sealing of transport paths in the wellbore using a solution of carbon dioxide and PFA.

$CO_2$-solubilized PFA is an excellent candidate for sealing even the smallest of cracks as, for example, illustrated schematically in FIG. 4. Once again, PFA is a sticky, stretchy, transparent, amorphous polymer that is the only known high-molecular-weight compound capable of dissolving to several wt % concentrations in high-pressure $CO_2$ without cosolvents. PFA has a low glass transition temperature of ~6° C. and is thermally stable to 275° C. Studies hereof have shown that an extremely low viscosity liquid $CO_2$-based solution containing a dilute concentration PFA will penetrate into very small, low permeability cracks and seal them via adsorption of PFA as illustrated in FIG. 4. Once again, a low viscosity (for example, 0.05 to 1.0 cp) allows the $CO_2$-solubilized PFA to flow into even the smallest cracks that may otherwise provide a path for the leakage of the $CO_2$ from a formation in which it is to be sequestered.

Figure 5:
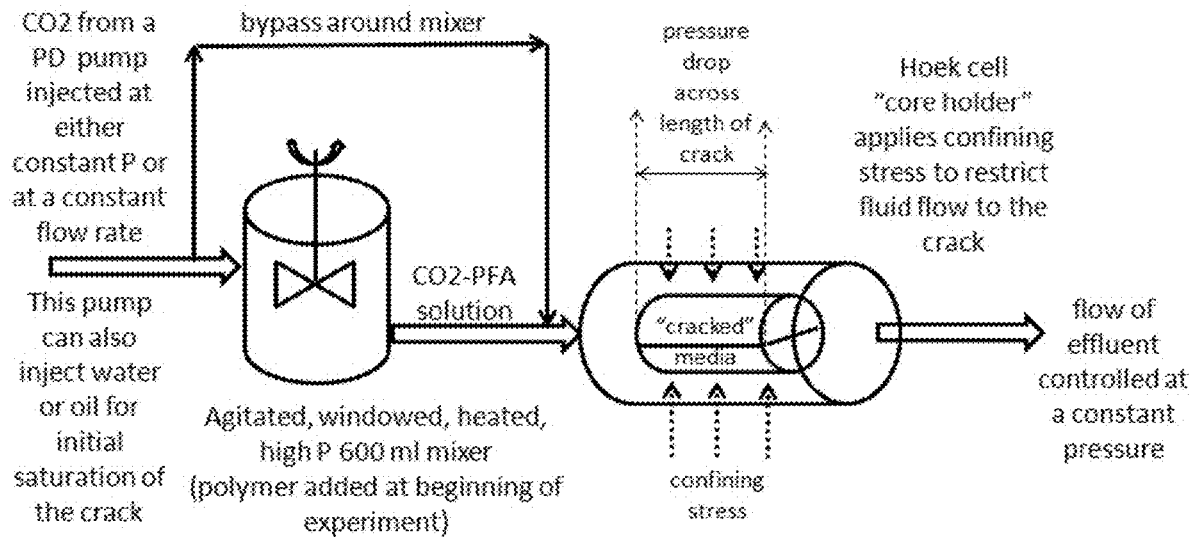
FIG. 5 illustrates an embodiment of a system hereof for studying the sealing of transport paths (for example, cracks) in a medium.
Figure 6:
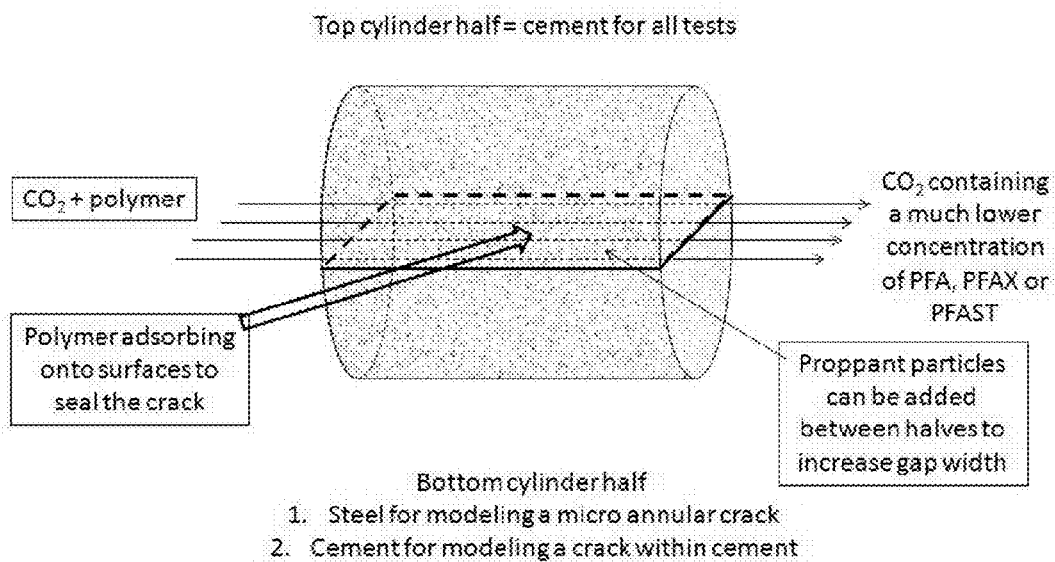
FIG. 6 illustrates a methodology for modeling cracks between cement and (a) steel pipe, (b) cement, and (c) a sandstone or other rock formations using cement plugs which are axially bisected.

A high pressure apparatus as illustrated in FIG. 5 may, for example, be used to test the compositions and methodologies hereof in sealing cracks or other transport paths. Model cement-cement and cement-metal arrangements may be used to simulate cracks within the cement and micro annular cracks, respectively, as illustrated in FIG. 6. A windowed, 600 ml, high pressure, agitated, heated, Parr reactor was used as a mixer to prepare transparent, single phase solutions of polymer in $CO_2$ containing 1 to 20 wt % polymer. The experiments were conducted at pressures just above the cloud point pressure for the PFA-$CO_2$ solution and temperature being studied. During a typical constant-flowrate experiment, pure $CO_2$ is displaced into the Parr vessel, which is continuously stirred, at the same rate that the polymer-$CO_2$ solution is withdrawn from the vessel. The polymer-$CO_2$ solution is directed through insulated tubing to a core holder that retains two half-cylinders. The differential pressure across the core is monitored to detect the large pressure drop associated with the polymer sealing the crack(s). The effluent solution passes through insulated tubing into a high-pressure positive displacement pump that is operating at the same volumetric flow rate, but in the opposite direction, as the $CO_2$ injection pump. Alternately, such experiments may be conducted in a constant-pressure-drop mode and the volumetric flow rate monitored. In such a mode of operation, dramatic decreases in flow rate will occur as the polymer seals the crack(s).

A number of studies were conducted in a core apparatus shown in FIG. 5 to demonstrate that a PFA seal is deposited within cracks of a cement core. As the seal is forming, polymer-depleted $CO_2$ leaks farther into the crack. In several studies, a cement crack was sealed via the injection of a few "pore volumes" of a dilute solution (1 wt %) of the PFA in $CO_2$ (wherein the "pore volume" is the volume of the crack, opening or other fluid transport path). The sticky polymer is highly hydrophobic and oleophobic (that is, multiphobic), and the sealed crack is impermeable to natural gas, crude oil, brine etc. Therefore, the methodology hereof is well suited for the remediation of cracks or other transport paths with substantial permeability to natural gas and/or other gases and/or liquids but which are too small to be plugged using rapidly-pumped materials having viscosities that far exceed those of the formation fluids. The methodology hereof thereby provides a significant advance in, for example, the enhancement of wellbore integrity.

Figure 7:
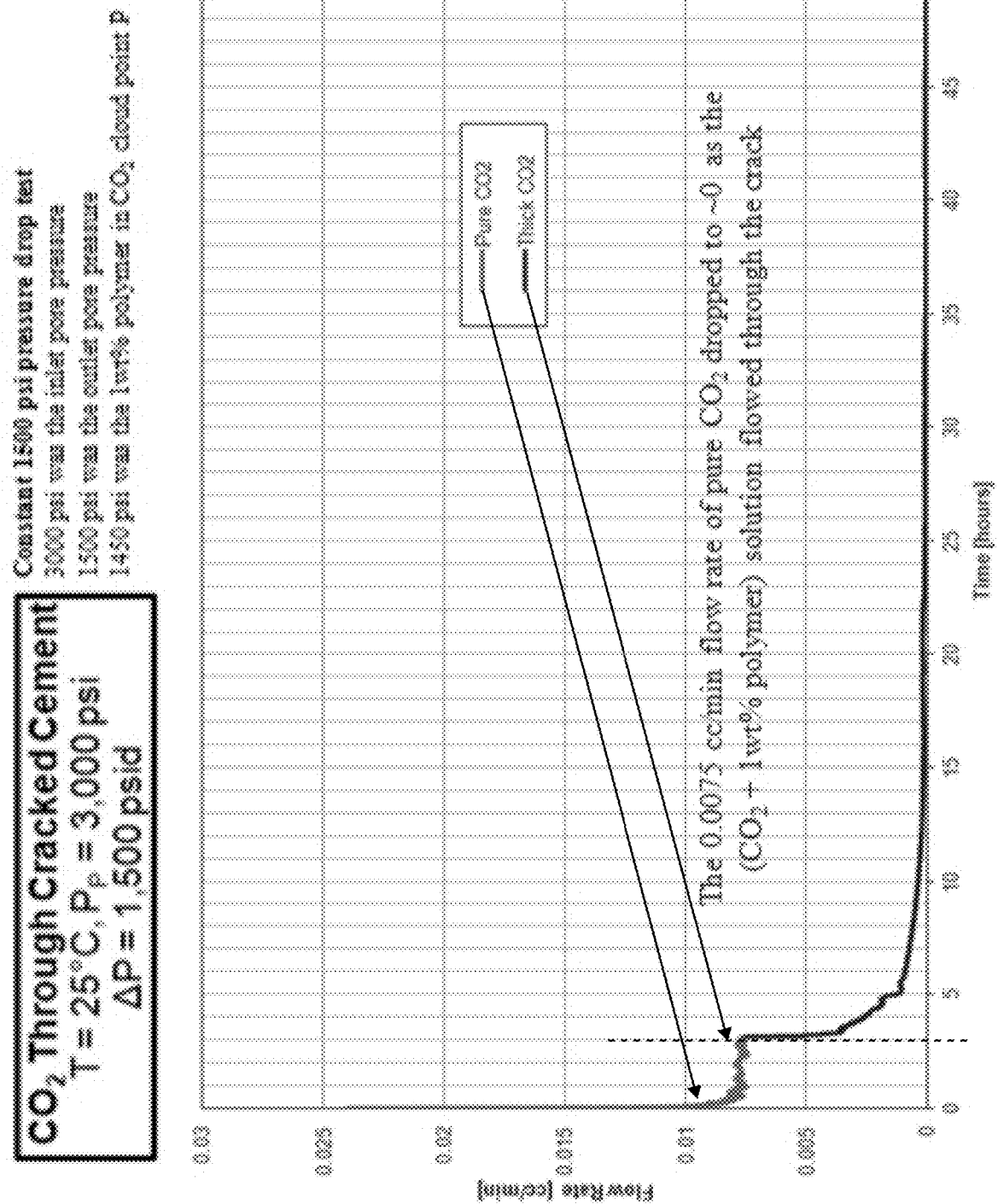
FIG. 7 illustrates a study of flow rate versus time data for injection of a $CO_2$-PFA solution into an 81 nanoDarcy simulated crack in cement at a constant pressure drop of 1500 psia (wherein an outlet pressure is maintained at 1500 psia).

Studies were conducted in the apparatus of FIG. 5 at 23° C. to determine if a $CO_2$-PFA solution could penetrate cracked cement with an extremely low apparent permeability and seal the crack. It was hypothesized that if PFA adsorption onto cement occurred, then the deposited PFA layer could actually seal the crack along its length (rather than just as the entrance to the crack). In several studies, 6 inch long, 2 inch diameter Portland cement plugs were made, and the permeability thereof was determined to be below the detection limit of the equipment. The cement cylinder was then sawn in half as illustrated in FIG. 6, and the two halves were carefully placed together and inserted into the rubber sleeve of a high-pressure core holder. After applying a confining pressure of 5000 psi, pure $CO_2$ was injected using and inlet pressure of 4500 psi and outlet pressure of 3000 psi, and a steady-state flow rate of 0.0075 ml/min was established, as shown in FIG. 7. The results indicated a permeability of 0.000081 mD (0.081 micro Darcy, 81 nano Darcy) based on the entire cross-sectional area of the plug. A solution of $CO_2$ and 1% PFA was then introduced to the cracked cement under the same conditions. After injection of only 2 ml of the solution (containing about 0.02 gr PFA) at a constant pressure drop of 1500 psi, the flow through the cracked cement became immeasurably small, indicating a seal had been formed (see FIG. 7).

Figure 8:
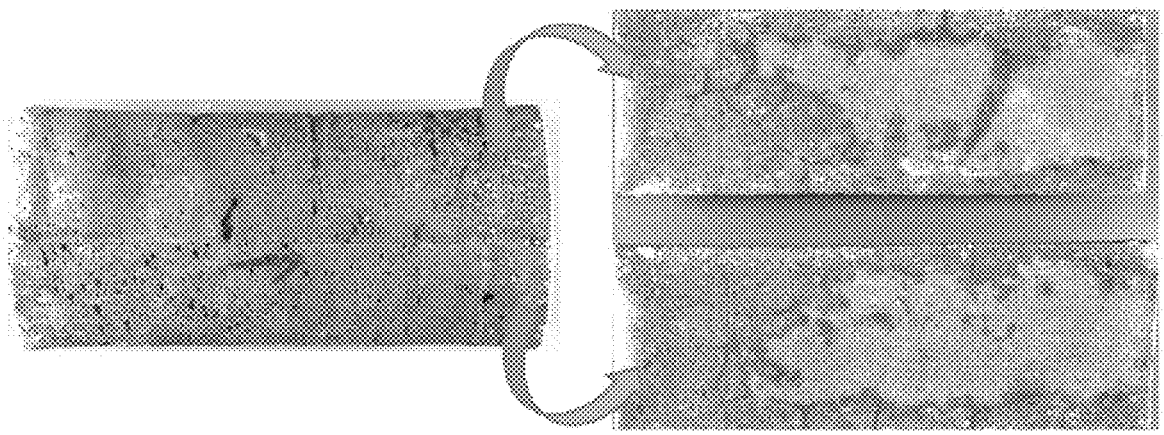
FIG. 8 illustrates photographs of the appearance of the bisected cement plug tested in the studies of FIG. 7 before (left) and after (right) the halves of the bisected cement plug are pried apart.

After the experiment, it was observed that the cement halves were "glued" together by the adsorbed PFA. After prying the halves apart (see FIG. 8), it was noted that water "beaded up" anywhere a droplet was placed on the flat surfaces. Further, the relatively thicker portions of the PFA film appeared as a sticky lighter colored (white or yellow) coating over most of the cement crack surfaces as seen in FIG. 8.

Figure 9:
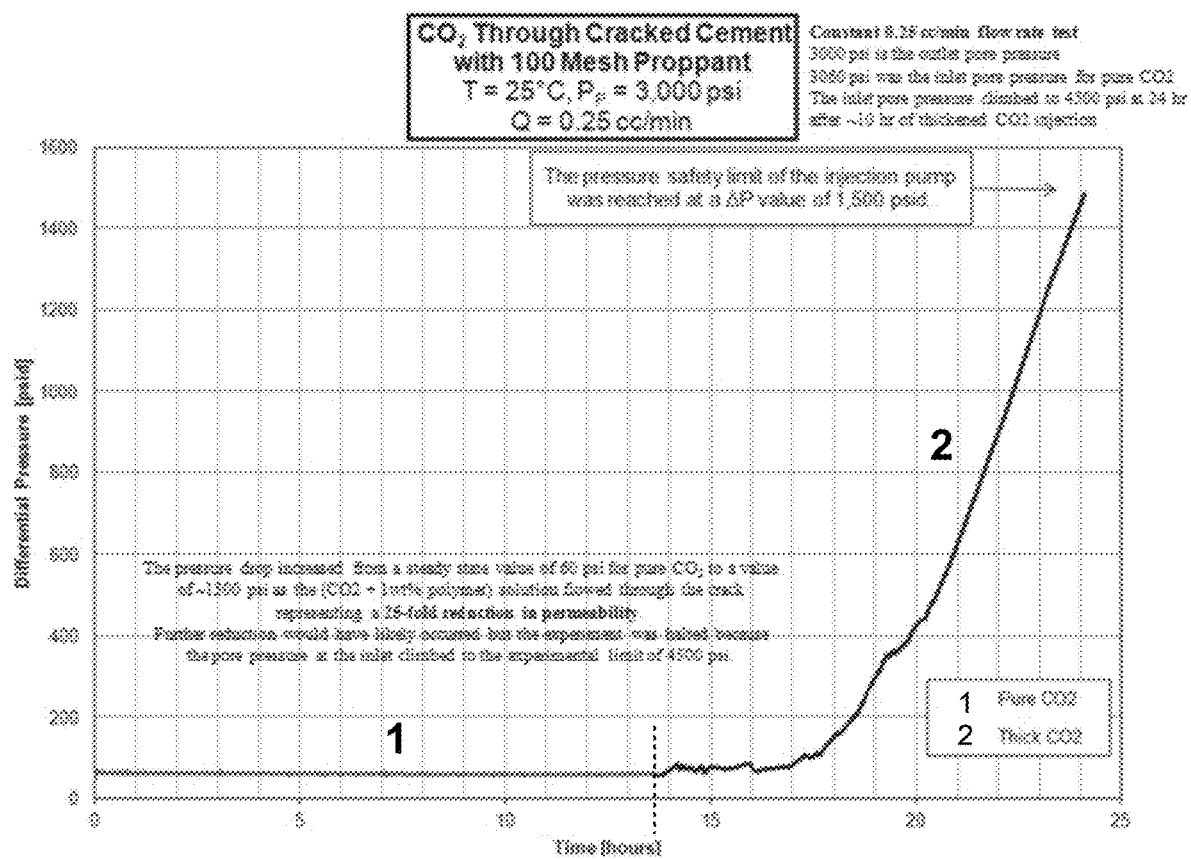
FIG. 9 illustrates a study of flow rate versus time for injection of a $CO_2$-PFA solution into an 89 nanoDarcy simulated crack in cement at a constant flow rate of 0.25 ml/min (wherein an outlet pressure is maintained at 1500 psia).
Figure 10:
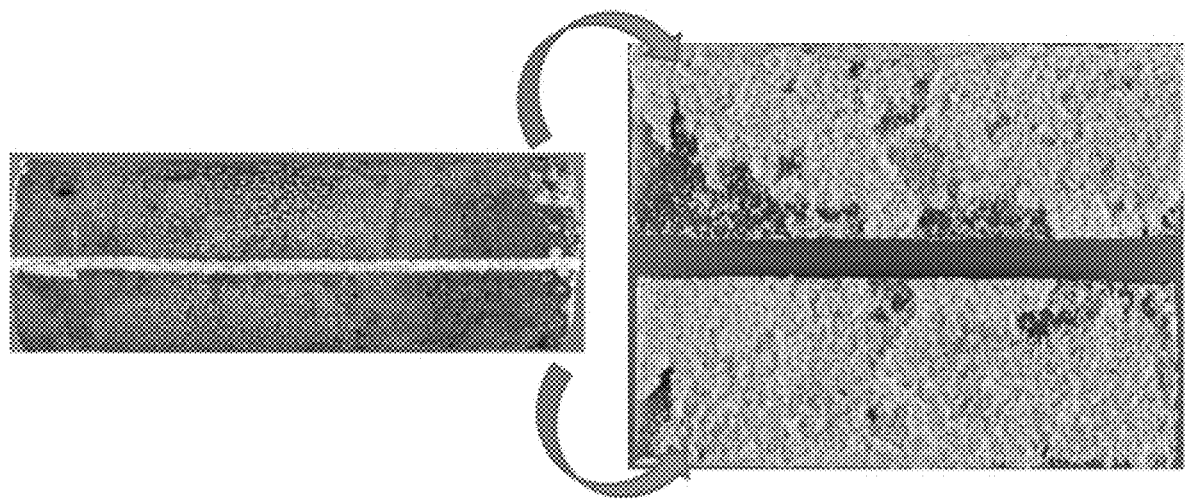
FIG. 10 illustrates photographs of the appearance of the bisected cement plug tested in the studies of FIG. 9 before (left) and after (right) the halves of the bisected cement plug are pried apart.

In other studies, 6" long, 2" diameter Portland cement plugs were made, and the permeability thereof was determined to be below the detection limit of the equipment. The cement cylinders were once again sawn in half, and the two plug halves were carefully placed together with a thin layer of unconsolidated 100 mesh sand therebetween and inserted into the rubber sleeve of a high pressure core holder. After applying a confining pressure of 5000 psi, pure $CO_2$ was injected at a constant flow rate of 0.25 ml/min with the core outlet pressure maintained at 1500 psi. A steady-state flow rate pressure drop of 60 psi was established for pure $CO_2$ as shown in FIG. 9. The results indicated a permeability of 0.089 mD (89 micro Darcy) based on the entire cross-sectional area of the plug. A solution of $CO_2$ and 1 wt % PFA was then introduced to the cracked cement at the same conditions. After injection of only 2.5 ml of the solution (containing about 0.025 gr PFA), the pressure drop attained the highest permitted level of 1500 psi (at which point the inlet pressure attained 4500 psi, which was 500 psi less than the overburden pressure, FIG. 9). Therefore, the test was stopped. At this point, the permeability of the crack had been reduced 25-fold to a value of 3.25 microDarcies.

In a number of embodiments of the methodologies hereof, a defective portion of a casing may be isolated, for example, with a straddle packer system and then the $CO_2$-polymer solution may be passed through either (1) a defect/hole in the casing or (2) a perforation made for remediation to flow into the cracks associated with the cement. The polymer adsorbs onto the rock/cement surface while forming a seal.

The injection of a supercritical solution of a PFA-based polymer in $CO_2$ thus provides the hydrocarbon recovery and other industries with a very low viscosity fluid for sealing relatively small transport paths in a wide range of materials. Once again, the sealing fluids hereof need not fill large gaps or voids. Sealing of such relatively large fluid transport paths may be accomplished via conventional sealants such as cement squeezes and resin squeezes. However, the low viscosity fluids hereof may block the entrance to very small transport paths as well as penetrate deep within such transport paths to seal them completely. Unlike methodologies in which a de-pressurized gas-polymer mixture is "sprayed" upon a surface, in the methodologies hereof, high pressure adsorption of PFA onto surfaces is achieved in which deep penetration of $CO_2$-solubilized PFA within transport paths such as cracks or fractures occurs.

The ability of the polymer-$CO_2$ solutions hereof to alter the surface and fluid transport properties of a range of materials was further demonstrated in studies of the user thereof in, for example, conformance control in hydrocarbon recovery. Polymer-$CO_2$ solutions were shown to be able to displace a variety of other fluids (for example, $CO_2$, brine, oil etc.) in reducing the permeability or porosity of a material. In general, conformance is a measure of the uniformity of the flood front of an injected drive fluid during an oil recovery flooding operation and the uniformity vertically and areally of the flood front as it is propagated through an oil reservoir. In use as a conformance agent, the compositions hereof may be used to modify the wettability/permeability of subterranean rock in the well. The compositions hereof may also be used as sealants in subterranean $CO_2$ sequestration.

If one passes a high pressure, low viscosity, single phase, solution of $CO_2$ and a dilute concentration of a high-molecular-weight PFA through porous media (such as cement, carbonate or sandstone), the PFA tends to adsorb on the material surfaces. Indeed PFA also absorbs on metallic surfaces. Indeed, the compositions hereof may be used to seal or protected metallic surfaces such as gas/oil pipelines or portions thereof. Because PFA is highly multiphobic, the adsorbed PFA dramatically changes the wettability and fluid transport characteristics of the material. Fluid transport properties such as leakiness, permeability or porosity of the media toward any fluid (for example, water or $CO_2$) decreases significantly. This change in fluid transport properties may, for example, make it difficult for an injected fluid (such water or pure $CO_2$) to flow through the PFA-coated material.

A solution of carbon dioxide and a multiphobic polymer such as PFA may thus be used for "conformance control" during $CO_2$ flooding in enhanced oil recovery wherein the injected fluids are able to enter two or more layers including a high permeability, oil-depleted layer, referred to as a thief zone (because most of the injected $CO_2$ enters that layer but results in no oil production), and a low permeability oil-rich zone where one wants $CO_2$ to flow so it can displace the oil. Typically, $CO_2$ will not flow into the low permeability layer there is much less resistance to flow through the thief zone.

One may, for example, isolate the thief zone and then inject a small volume of the PFA in $CO_2$ solution hereof in the thief zone only, thereby dramatically lowering its permeability. Subsequently, most or all of pure $CO_2$ injected will be diverted to the oil-rich zone and oil recovery will be enhanced because the $CO_2$ was successfully diverted from flowing into the thief zone, thereby resulting in conformance control.

Use of a polymer-$CO_2$ solution hereof for conformance control would thus enable diversion of subsequently injected $CO_2$ away from thief zones and toward lower permeability, oil-rich zones. As described above, PFA is an amorphous, sticky, transparent, homopolymer that dissolves readily in $CO_2$ at temperatures and pressures commensurate with $CO_2$ enhanced oil recovery or EOR. Because PFA has high molecular weight, the addition of, for example, 1 wt % PFA to $CO_2$ thickened $CO_2$ by a factor of approximately four. A number of core floods studies were conducted to determine if the adsorption of PFA onto the rock surfaces could reduce permeability and potentially provide conformance control. As described in connection with cement sealing operations, when a $CO_2$-PFA solution is injected into porous media, a portion of the dissolved PFA strongly adsorbs onto the mineral surfaces. This adsorption occurs, regardless of what fluid was originally present in the pores. Because PFA is highly hydrophobic and oleophobic, a thin PFA film deposited on the rock surfaces changes the wettability and dramatically reduces the permeability of the rock (especially sandstone) for subsequently injected fluids. The strong adsorption of PFA and the change in wettability significantly reduces the permeability of the rock to subsequently injected brine or $CO_2$. In a number of studies, dual parallel core floods were conducted to demonstrate the efficacy of PFA-$CO_2$ solutions for conformance control. Good results were obtained when a PFA-$CO_2$ solution was injected solely into an isolated high permeability (for example, 80 mD) Berea sandstone core (the thief zone) that was previously flooded with brine and $CO_2$. After such a treatment, the Berea core was then placed in parallel with a 20 mD Carbon Tan sandstone core. All of the subsequently injected $CO_2$ was diverted to the Carbon Tan core. Similar results were obtained with dual parallel limestone cores.

Although PFA is soluble in compressed liquid $CO_2$ and high pressure supercritical $CO_2$, it is insoluble in hydrocarbon solvents. Therefore, the PFA is expected to become less soluble in the $CO_2$-rich fluid as one progresses away from an injection well because it is insoluble in brine and insoluble in crude oil, and the extracted hydrocarbons that enter the $CO_2$-rich phase act as an "anti-solvent" for PFA. Such a reduction in solubility was experimentally verified during phase behavior studies wherein the dissolution of PFA in $CO_2$-alkanes mixtures was studied. It was, for example, determined that the PFA polymer at 24° C. and pressures up to 10000 psi, PFA was insoluble in a $CO_2$-rich fluid containing 30 wt % of a mixture of $CO_2$-extractable hydrocarbons (40 wt % n-hexane, 26.7 wt % n-decane, 13.3 wt % n-tetradecane, 6.7 wt % n-hexadecane, 8.7 wt % n-octadecane, 6.7 wt % n-eicosane; Sigma Aldrich). When only 15 wt % of these $C_6$-$C_{20}$ hydrocarbons was present in 85% $CO_2$, the cloud point pressure was for dissolving 0.5 wt % PFA in the 85% $CO_2$—15% hydrocarbon mixture fluid was 3000 psi. 1 wt % PFA could not dissolve in this $CO_2$-hydrocarbon mixture at pressures to 10000 psi. These results clearly demonstrate that the extraction of light alkanes into $CO_2$ will significantly reduce the solubility of PFA in $CO_2$.

The anti-PFA-solvent effects of light alkanes provide a disincentive for the injection of ($CO_2$ PFA) solutions in, for example, mobility control in oil-rich zones because it is likely that the PFA will precipitate as the light alkanes are extracted into the $CO_2$-rich phase during an EOR process. If, however, the $CO_2$-PFA solution is injected into a watered-out, thief zone into which large proportions of injected $CO_2$ have also been injected during EOR, it is likely that there will be little if any oil extracted into the $CO_2$-PFA solution in the near wellbore region. Therefore it is unlikely that any of the PFA would come out of solution as a result of solubility reducing effects of light hydrocarbons during conformance control if the $CO_2$-PFA solution is injected solely in the isolated thief zone.

Table 1 sets forth properties of a number of commercially available 1.5 inch diameter, 12 inch long cores purchased from Kocurek Industries Inc. of Caldwell, Tex. for use in the studies hereof. Nominal permeability values were provided by Kocurek. The $K_{brine}$ (liquid permeability in millidarcies) was measured at Special Core Analysis Laboratories or SCAL, Inc. of Midland, Tex. for a single example of each core type. A core was used in only one test. No cores were re-used. In Table 1, UCS is unconfined strength A pressure difference between the overburden pressure and the pore pressure (which is lowest at the core outlet) was not available that was greater than this value.

TABLE 1

| Name of core | Type of core | UCS* psi | $K_{brine}/K_{gas}$, mD nominal values | $K_{brine}$ mD | Φ% | Formation |
|---|---|---|---|---|---|---|
| Berea A-IOI | Sandstone | 6,500 | (60-100)/(200-315) | 94 | 20 | Kipton |
| Carbon Tan A- | Sandstone | 7,600 | 11/42 | 7 | 15 | Utah |
| Indiana Ls 70mD | Limestone | 5,000 | 70/200 | 114 | 19 | Bedford |
| Edwards Yellow B- | Carbonate- | 2,500 | 40175 | 4.2 | 22 | Edwards Plateau |

It was anticipated (based upon the viscosity study results illustrated FIG. 2) that as long as the entire pore space of the core remained at a pressure of about 3000 psi, which is well above the single-phase pressure of 1450 psi for $CO_2$-PFA solutions, the viscosity of a 1 wt % PFA in $CO_2$ solution would be no greater than about four times greater than the viscosity of pure $CO_2$. If the volumetric flow rate of the $CO_2$ was held constant, and if the back pressure (BP) of the apparatus (that is, the effluent pressure of the core) was maintained at a constant value with a back pressure regulator (BPR) or a computer-controlled positive displacement (PD) pump, then the pressure drop for the core should increase by a factor of approximately 4 as the 1 wt % PFA-$CO_2$ solution displaced pure $CO_2$ from the core. Indeed, preliminary experiments indicated that the pressure drop increased by a factor of roughly 3-4 at or before one pore volume of the PFA-$CO_2$ solution had been injected. However, the pressure drop continued to rise to far greater values as the injection continued.

Figure 11:
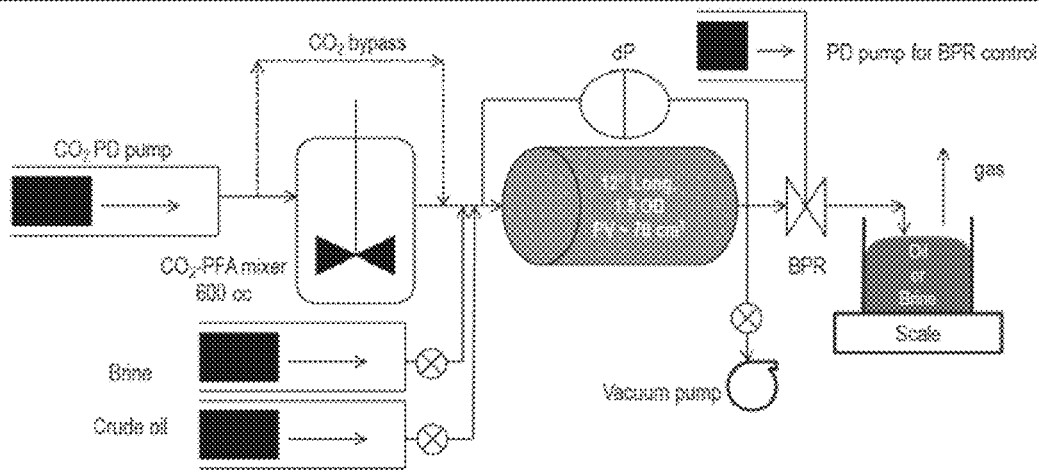
FIG. 11 illustrates three experimental setups for the study of the displacement of a solution of PFA in $CO_2$ (a PFA-$CO_2$ solution) into a single core initially saturated with $CO_2$ (Setup 1 or 2), brine (Setup 1) or crude oil (Setup 1); or for the displacement of $CO_2$ or a PFA-$CO_2$ solution into dual parallel cores initially saturated with brine (Setup 3).
Figure 11:
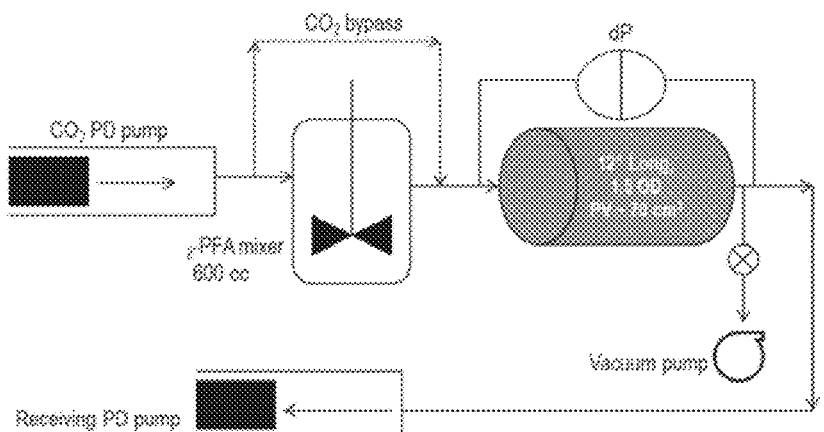
Figure 11:
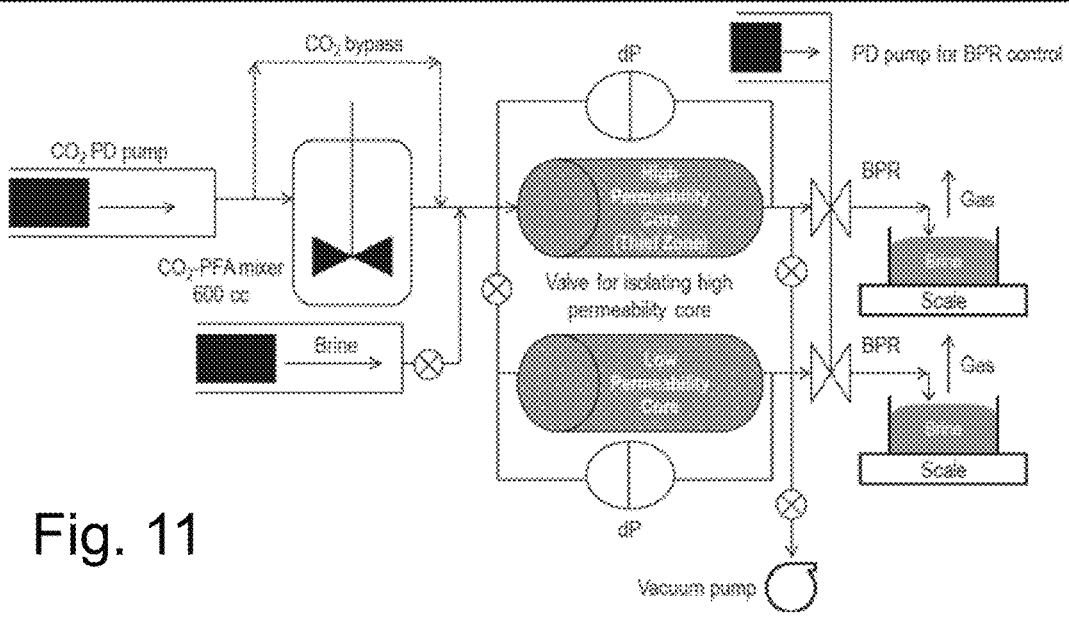

Core flooding equipment configurations used in the studies hereof are illustrated in FIG. 11. Fluids used during displacements included $CO_2$ (Praxair, Industrial grade 99.9%), dead SACROC crude oil (from the SACRO oil field of Kinder Morgan of Houston, Tex.; 2.39 mPa s at 25° C.), or a synthetic brine including 4 wt % KCl (available from Fisher Scientific) in distilled water. The concentration of 4 wt % KCl was selected to minimize clay swelling effects. PFA is known to be insoluble in all brines. Therefore no partitioning of PFA into the brine phase would be expected in any test. The apparatuses included automated syringe pumps (available from Teledyne ISCO of Lincoln, Nebr.) for the injection of $CO_2$, brine or crude oil, a positive displacement pump (available from RUSKA Instruments Corporation of Houston, Tex.) for receiving core effluent in Setup 2; a differential pressure transducers (Yokogawa of Sugar Land, Tex.) for measuring pressure drops across the length of the core, and a digital scale (available from Mettler Toledo LLC of Columbus, Ohio) in Setups 1 and 3 for measuring the production of oil or brine.

All core floods were conducted at room temperature (24-25° C.) and an outlet pore pressure of 3000 psi, which is in excess of the cloud point pressure of the $CO_2$-PFA mixture and the estimated minimum miscibility pressure or MMP of the SACROC crude at 25° C. The low temperature facilitated the core flooding experimentation. The high pressure of 3000 psi, which was approximately 1600 psi above the cloud point of 1400 to 1450 psi, improved the chances that the $CO_2$-PFA solution would remain in the single-phase if a small amount of light oil components, which were expected to act as anti-solvents, were extracted into the $CO_2$-PFA solution. Displacements of $CO_2$ by PFA-thickened $CO_2$ were conducted at 0.25 ml/min or 2.5 ml/min, which correspond to superficial velocities of 1 ft/day and 10 ft/day. Displacements of oil in single cores were conducted at a constant $CO_2$ injection volumetric flow rate of 0.25 ml/min, which corresponded to a superficial flow rate of 1.04 ft/day in the 1.5 inch diameter cores. Displacements of brine in single cores were conducted at a constant $CO_2$ injection volumetric flow rate of 1.00 ml/min, which corresponded to a superficial flow rate of 4.16 ft/day. Displacements of brine from dual parallel cores were conducted at a constant total $CO_2$ injection volumetric flow rate of 0.25 ml/min.

Pore pressure for each test was maintained through the use of a back pressure regulator (Setup 1 and 3), or with a positive displacement pump that received effluent at constant pressure of 3000 psi (Setup 2). Pressure drop across the core was measured using a differential pressure transducer. For cases wherein the pressure drop across the core exceeded the maximum range of the differential pressure transducer, the pressure drop was estimated by taking the difference between the injection pump pressure and the outlet pore pressure.

During experiments that employed a back pressure regulator or BPR, PFA came out of solution in the BPR because the pressure dropped below the cloud point pressure. At the end of the experiments, when the apparatus was depressurized, the PFA would begin to come out of solution within all of the equipment when the pressure dropped below the cloud point pressure. The deposition and adhesion of PFA within the differential pressure transducer occasionally caused problems with pressure drop measurements. Because PFA is a sticky, stretchy polymer, the deposits had to be carefully removed via mechanical removal and with fluorinated solvents.

Setup 1 in FIG. 11 was used for the flow of 4 wt % KCl in water synthetic brine through a brine-saturated core at a constant volumetric flow rate to establish the absolute permeability of the core. Setup 1 in FIG. 11 was also used for the displacement of $CO_2$ by "PFA thickened $CO_2$" (that is, a single-phase 1 wt % PFA-in-$CO_2$ solution). In those studies, the core was first evacuated using the vacuum pump, and then saturated with $CO_2$. Pure $CO_2$ was then displaced into the core with the BPR set at a constant value of 3000 psi to establish the absolute permeability to $CO_2$. The thickened $CO_2$ needed for the next phase of the experiment had been prepared by first loading 5.5 grams of PFA into the 600 ml high pressure, windowed, agitated mixing vessel (a Parr reaction apparatus Model No. 4545A, 350° C., 5000 psi). $CO_2$ was then introduced to this mixing vessel until the pressure reached 3000 psia. Because the density of $CO_2$ at 25° C. and 3000 psi is 0.928 g/ml, this resulted in the addition of about 550 gr of $CO_2$ thereby yielding a 1 wt % PFA in $CO_2$ mixture within the mixer. This mixture was stirred for 15 minutes. It was visually confirmed that a single phase solution had formed by looking through the two opposing windows at the bottom of the vessel. The thickened $CO_2$ was then displaced into the core at the same volumetric flow rate as the pure $CO_2$. The 1 wt % initial PFA concentration was diluted slowly during the experiment as fresh $CO_2$ was added to the mixer as the $CO_2$-PFA was withdrawn at the same volumetric rate. The expression for $C_{PFA}$, the PFA concentration in the mixer and leaving the mixer under these conditions, assuming perfect mixing in the vessel, is provided below as a function of the cumulative amount of $CO_2$ displaced into the mixer after the start of the displacement experiment, $V_{CO2}$.

$$C_{PFA}[\text{wt \%}]=[1.0\text{ wt \%}]\exp[-V_{CO2}(\text{cm}^3)/600(\text{cm}^3)]$$

Because the typical pore volume of the core was approximately 70 cm$^3$, the concentration of PFA in $CO_2$ ($C_{PFA}$) fell from its initial value of 1.0% to 0.89% after one pore volume of $CO_2$ (PV $CO_2$) was injected into the mixer, 0.79% after 2 PV $CO_2$, and 0.70% after 3 PV $CO_2$. During the displacement, the pressure drop across the length of the core was recorded as a function of time and (because the volumetric flow rate was known) PVI. It was anticipated that PFA would come out of solution at the BPR because the pressure of the fluid leaving the BPR would be far below the cloud point pressure of 1450 psi. Because PFA is a sticky viscoelastic polymer, PFA deposits could result in problematic BPR operation. Therefore, thickened $CO_2$-displacing-$CO_2$ experiments were also conducted using Setup 2. In Setup 2, a positive displacement pump was used to receive the core effluent fluid, and its displacement rate was computer-controlled to maintain a constant pressure of 3000 psi. This operational mode resulted in essentially a constant volumetric flow rate that was approximately equal to the volumetric injection flow rate of thickened $CO_2$. Because no BPR was used and no sudden pressure drop occurred anywhere in the system, the pressure drop results associated with Setup 2 were expected to exhibit a smaller degree of noise.

PFA-$CO_2$ solutions were also used in displacing brine or oil from single cores. Those studies were conducted with Setup 1 to allow the measurement of produced liquid brine or oil as a function of time and PVI. After evacuating the core, it was saturated with the liquid; either dead SACROC crude oil or synthetic brine composed of 4 wt % KCl. $CO_2$ or thickened $CO_2$ was then displaced into the core. A digital scale was used to measure the liquid production as a function of time. Setup 3 of FIG. 11 was used to assess various strategies for diverting the flow of $CO_2$ away from a high permeability core (representing a thief zone) and toward a low permeability core. Thickened $CO_2$ could be, for example, introduced into both brine saturated cores simultaneously, or only into the isolated high permeability core. After the injection of the PFA-thickened $CO_2$, pure $CO_2$ was allowed access to flow into both cores. Digital scales were used to measure the brine production from each core as a function of time.

Figure 12:
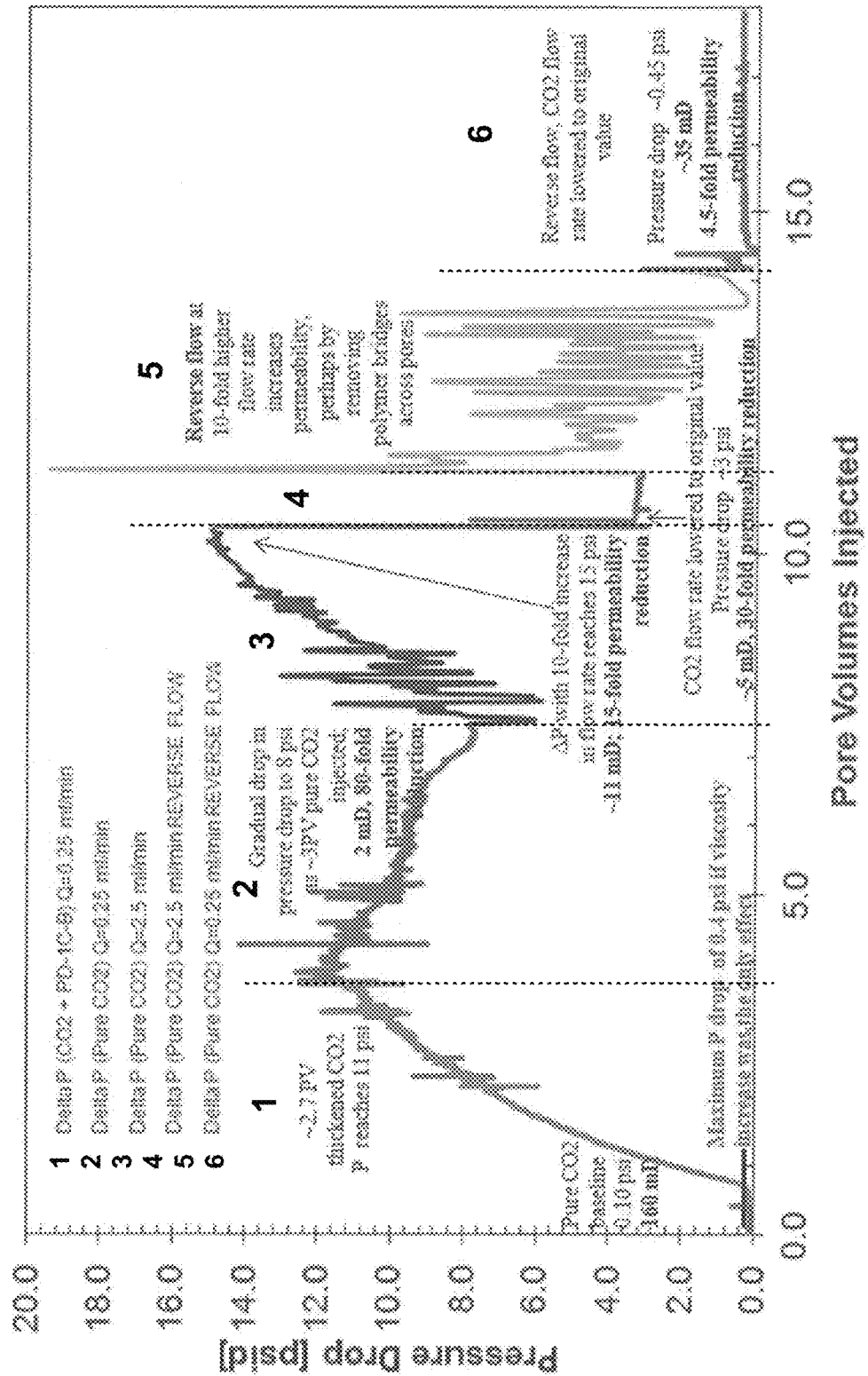
FIG. 12 illustrates a study of pressure drop vs. pore volume injected (PVI) for a solution of PFA in $CO_2$ (1 wt % PFA in $CO_2$) displacing pure $CO_2$ from a Berea sandstone core, followed by various modes of pure $CO_2$ injection.

The pressure drop vs. pore volumes injected (PVI) results for one study in which $CO_2$ was displaced by a PFA-$CO_2$ solution is provided in FIG. 12 in which the various listed injection steps are delineated by numbering and broken lines. The initial baseline differential pressure drop for the core at the injection flow rate of 0.25 ml/min was 0.1 psi or 0.1 psid (pounds per square inch differential), corresponding to an absolute permeability based on the flow of pure $CO_2$ ($K_{CO2}$) of 160 mD. Therefore, if the only effect of PFA was to change the viscosity of the $CO_2$, then the pressure drop should have increased by a factor no greater than four to only approximately 0.4 psi. As shown in FIG. 12, the pressure drop quickly exceeded 0.4 psi, reaching about 11 psi (a 110-fold increase compared to the original pressure drop across the core for pure $CO_2$) after 3 PVI of the 1 wt % PFA-$CO_2$ solution (that is, PFA-thickened $CO_2$). The pressure drop was still increasing with increasing PVI of $CO_2$-PFA at this time. This dramatic increase in pressure drop was indicative that the PFA was retained within the core, changing its surface energy/wettability and/or blocking pore throats. If this loss of PFA to the core was occurring, then the concentration of PFA in the $CO_2$ would be decreasing, thereby reducing the degree of $CO_2$ thickening. The reduction in permeability caused by PFA adsorption was a much more significant effect than the $CO_2$ becoming less viscous because the pressure drop increased dramatically.

The injection was then switched back to pure $CO_2$ and 4 PV of pure $CO_2$ was then injected into the core to determine the permeability of the core at this time. The pressure drop fell to 8 psi (a value 80-times greater than the baseline pressure drop of 0.1 psi), which corresponded to an approximately 80-fold reduction in permeability. At this point further study was made to determine if the retention of PFA within the core was a result of a strong irreversible adsorption of PFA on the surfaces or the occurrence of less tightly bound deposits of PFA across pore throats that could be dislodged by increases in flow rates or reversals in flow directions.

Therefore, the flow rate of the $CO_2$ was increased by a factor of 10. After ~3 PV of pure $CO_2$ was injected at this elevated rate, the pressure drop reached 15 psi. This corresponded to the permeability being 15 times lower than it was originally (rather than 80 times less). This restoration of some of the lost permeability may, for example, indicate that the 10-times greater flowrate of $CO_2$ removed some of the adsorbed/deposited PFA from the pores or pore throats. When the $CO_2$ flow rate was then reduced to the original value and a single PV of $CO_2$ was injected, the pressure drop reached 3 psi, representing a 30-fold permeability reduction relative to the baseline.

In another attempt to recapture some of the lost permeability, $CO_2$ was subsequently directed into the core in the reverse direction at the elevated flow rate. There was a very significant amount of noise associated with this injection, perhaps indicative of PFA being displaced or PFS bridges across pores throats being broken. Finally, when the flow rate was maintained in the reverse direction, but at the original flowrate, the pressure drop reached 0.45 psi, corresponding to a 4.5-fold permeability reduction.

These results demonstrated that the injection of the PFA-in-$CO_2$ solution dramatically reduced the permeability of the dry Berea sandstone core. Although some of the permeability could be regained by increasing the volumetric flowrate and reversing the direction of flow with pure $CO_2$, the core ultimately exhibited a permeability 4.5 times less than its original value. The unexpectedly high pressure drops could not be attributed to particles or impurities in the thickened $CO_2$ because the phase behavior experiments demonstrated that there were no $CO_2$-insoluble particles in the PFA. Further, the transparent PFA-$CO_2$ solutions were directed through in-line filters prior to entering the core (no particles were found on these filters after the experiments). Neither could the large pressure drops be attributed to either viscosity enhancement or precipitation of the PFA as a result of pressures falling below the cloud point.

Figure 13:
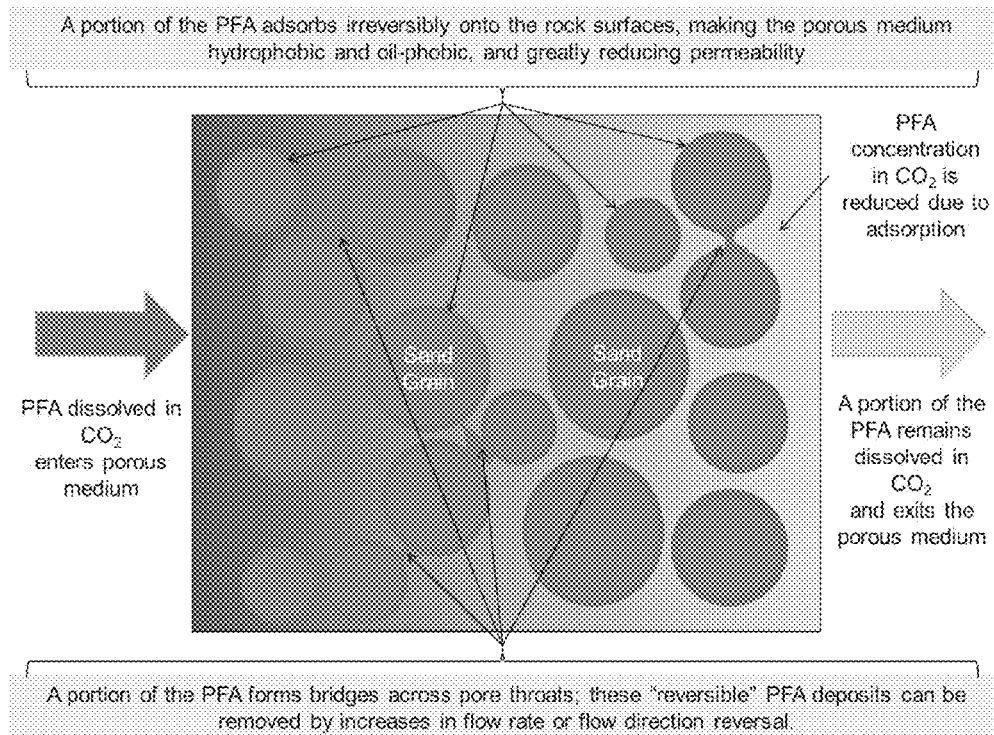
FIG. 13 illustrates a proposed model of result of high-pressure treatment of a sandstone core with a solution of PFA in $CO_2$ (for example, 1 wt % PFA in $CO_2$) to displace $CO_2$ from the core.

Three other experiments were conducted in which cores were initially saturated with $CO_2$, followed by the injection of several PV of a $CO_2$-PFA solution, and then several PVI of $CO_2$. In each case, the pressure drop measurements at the end of the experiment where $CO_2$ was flowing through the core (after the PFA-$CO_2$ solution had been injected) indicated that a ~100-fold reduction in $CO_2$ permeability had occurred. It was concluded that the most reasonable explanation for these results was that some of the PFA remained in solution, some of the PFA had adsorbed irreversibly, and some of the PFA had been retained more weakly in a manner that was reversed by changes in flow magnitude and/or direction (see FIG. 13). An attempt was then made to verify that some of the PFA had exited the core, and that a portion of the PFA had been retained by the core.

After experiments that employed a BPR to control effluent pressure at 3000 psi were completed, deposits of the sticky PFA were found in the BPR and just downstream of the BPR. This provided direct confirmation that a portion of the PFA remained in solution, passed through the core, and came out of solution downstream of the core in the BPR where the fluid pressure was reduced far below the cloud point pressure. These PFA deposits contributed to the noise in the pressure drop data for $CO_2$-PFA solution experiments that used the BPR (FIG. 11).

An attempt was then made to detect changes in the mass of the core that would demonstrate retention of the PFA polymer. The cores always exhibited an increase in mass of up to several grams, which was indicative that PFA remained in the core. However, many repeated attempts to determine an accurate level of PFA adsorption via PFA material balance (mass of PFA originally placed in the mixer=mass of PFA remaining in the mixer+mass of PFA found in BPR and downstream tubing+increase in mass of the core due to adsorption of PFA) were of limited success. PFA also has an affinity to adsorb on metal surfaces, and it was very difficult to remove that polymer from the interior surfaces of tubing, vessels, the differential pressure transducer, fittings and the BPR. Although slight increases in the mass of the core (up to several grams) were consistently measured, the adsorption may have been slightly underestimated because there was a loss in the core mass associated with small pieces of the surface particles falling off of the core surface (for example, grains of sandstone) while removing it from the core holder. However, a successful material balance was performed with an Indiana Limestone core (732.9 gr, ~70 ml pore volume) that showed no detectable particles falling off of the core as it was removed from a core holder and transferred to a scale. A concerted effort was made to recover as much PFA as possible from the $CO_2$-PFA mixing vessel and the metal surfaces of disassembled equipment downstream of the core, including the BPR. The material balance indicated that of the 5.5 gr PFA originally placed in the mixer, 2.4 gr PFA remained in the mixer, 0.7 gr was found in the pressure transducer, downstream tubing and BPR, and 2.4 gr PFA was retained by the core. Therefore, the injection of 7 PV of PFA-in-$CO_2$ solution of slowly decreasing concentration (1 wt % PFA at the beginning of the test down to 0.44 wt % at the end of the test, from Equation 4) accounted for the introduction of 3.1 gr PFA into the core. 0.7 gr PFA exited the core and 2.4 gr PFA was retained by the core (77% of the PFA that entered the 732.9 gr Indiana Limestone core), therefore the polymer adsorption for this test was 3.3 mg PFA/gr limestone.

Figure 14:
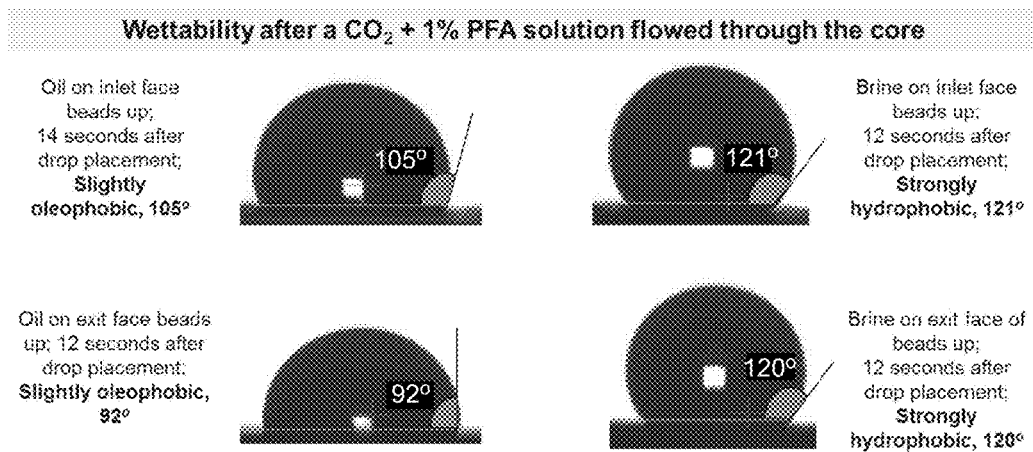
FIG. 14 illustrates photographs showing changes in the wettability of the inlet and outlet faces of a core as a result of the adsorption of PFA from 3 PVI of a 1 wt % PFA-$CO_2$ solution at 3000 psi and 24° C., followed by venting of the core, illustrating that the cores become hydrophobic and oleophobic, wherein the initial water contact angles for untreated Berea cores were 3° (core 1) and 26° (core 2) while the oil contact angles were 4° (core 1) and 74° (core 2).

An ambient pressure wettability study was conducted on a Berea Sandstone core after the displacements to provide an indirect means of verifying that PFA had adsorbed onto the pore surfaces the external surfaces of the core. Because PFA is both hydrophobic and oleophobic, the adsorption of PFA would be expected to induce significant increases to the contact angle of water or oil droplets on sandstone or carbonate surfaces exposed to air. The results are shown in FIG. 14. Drops of mineral oil and synthetic brine spread onto the flat ends of the core within five seconds for an as-received Berea core exposed to air. The dry core was easily wet by both fluids and the contact angle for both oil and water were less than 4°. This result was deemed unusual in that the Berea core was so easily wet by both water and oil (this may have been attributable to residual fluids used by the supplier to prepare the core). Therefore, the tests were repeated on another dry as-received Berea core. The contact angle for the water drop was 26°, while the oil contact angle was 74°; indicating that that Berea core #2 was more easily wet by water than by mineral oil. Core flooding tests were then conducted in which $CO_2$ flowed through a dry Berea core, followed by the 3 PV of a 1 wt % PFA-$CO_2$ solution, followed by the slow depressurization of the core to atmospheric pressure; no $CO_2$ chaser was used. After being removed from the core holder, drops of brine and mineral oil "beaded up" on both ends of these "PFA-treated" cores that were exposed to air. The increase in contact angle being more dramatic for water than for oil, as shown at the bottom of FIG. 14. The water contact angle increased to 120°, while the oil contact angle increased to 105° on the inlet face and 92° on the outlet face. These results indicate that a transparent PFA fluoropolymer coating present on the entire surface area of the porous media rendered it more hydrophobic and more oleophobic than it was initially.

In another test to verify that the PFA had been adsorbed, an attempt was made to measure the permeability of different portions of the core length. If PFA adsorption was occurring, then one would expect the reduction of permeability to be greatest near the core inlet, where levels of adsorption would be the highest. Determination of the effect of PFA on the permeability of the core as a function of distance from the core inlet was studied by cutting the cores in half after the $CO_2$-PFA displacing $CO_2$ test was completed. "Split core" tests were conducted in which the 1.5-inch-diameter by 12-inch-long cores were cut in half, forming two 1.5-inch diameter, 6-inch-long cores. In these tests, pure $CO_2$ was first displaced through the 12-inch-long core to determine permeability, followed by approximately 6 PVI of PFA-thickened $CO_2$ (1 wt % PFA in $CO_2$), followed by a "chaser" of 2 PVI $CO_2$. The core was then vented and cut in half. The 6-inch-long inlet half-core was then re-inserted in the core holder and its permeability to $CO_2$ was determined. After the 6-inch-long half core was vented, the contact angles of water droplets were measured at various positions on the inlet and outlet faces of each half core. Results for various cores of Berea sandstone and Indiana limestone are set forth in Table 2 below.

TABLE 2

| Core and Initial Permeability of the 1.5" × 12" core to $CO_2$ at 3000 psi and 24° C. [mD] | $CO_2$ Permeability to $CO_2$ after the PFA-$CO_2$ flowed through the core [mD] | $CO_2$ permeability of the inlet half-core after the large core was vented, cut in half, and reinserted into the core holder [mD] | $CO_2$ permeability of the outlet half-core after the large core was vented, cut in half, and reinserted into the core holder [mD] |
|---|---|---|---|
| Berea SS 188 | 5.8 | 11 | 152 |
| Indiana LS 116 | 0.36 | 0.28 | 23.5 |

A significant reduction in $CO_2$ permeability was observed for both the sandstone and limestone cores that were initially saturated with $CO_2$. The reduction in permeability was more dramatic for the inlet half of the core than the outlet half, which would be expected if PFA was being adsorbed by the porous media. In the case of the Berea sandstone, both half-cores had higher permeability than the 12-inch-long core after it was subjected to the PFA-$CO_2$ solution (5.8 mD and 152 mD), which may be a result of removal of some of the weakly adsorbed PFA when the 12"-long core was vented. Similarly, a portion of the PFA originally retained by the 12-inch-long Indiana Limestone (0.36 mD) was removed when the 12-inch-long core was vented. Although the inlet half-core still retained a permeability (0.28 mD) lower than that of the 1-inch-long core (0.36 mD), the outlet limestone half-core had a permeability of 23.5 mD.

The brine-in-air contact angles increased from 3-26° for as-received Berea cores to values of 33-65° for the Berea half-cores that had been exposed to the PFA-in-$CO_2$ solution. The brine-in-air contact angles increased from approximately 2° for as-received Indiana Limestone cores to values of 33-65° for the Indiana Limestone half-cores that had been exposed to the PFA-in-$CO_2$ solution. The oil-in-air contact angles increased from approximately 6° for as-received Indiana Limestone cores to values of 33-50° for the Indiana Limestone half-cores that had been exposed to the PFA-in-$CO_2$ solution. These changes reflected an increase in the hydrophobic and oleophobic nature of the dry cores, which can be attributable to the adsorption of PFA. These changes in wettability to oil and (aqueous) brine droplets were not as dramatic as those shown in FIG. 14 for a 12-inch-long Berea core that was flooded with 3 PV of a 1 wt % PFA-$CO_2$ solution and then vented. The half-core tests involved an additional chaser of $CO_2$ in the 12-inch-long cores, the injection of more fresh $CO_2$ into the half-core during the permeability test, and the subsequent venting after the half-core. These actions apparently removed some of the PFA originally retained by the 12-inch-long core.

In crude oil displacement studies, the core floods were conducted at 24° C. at 3000 psi. A Berea sandstone core was, for example, saturated with filtered dead SACROC crude oil provided by Kinder Morgan; the absolute permeability of the core ($K_O$) was 31.4 mD based on the flow of SACROC crude. The core was flooded with $CO_2$ at a pressure of 3000 psi, a value that is well above the minimum miscibility pressure (MMP) of 1850 psia at 54.4° C. for SACROC crude oil. Because MMP decreases with decreasing temperature, the conditions of 3000 psi at 24° C. were more than sufficient to ensure that the MMP at 24° C. had been exceeded. The $CO_2$ was injected at a constant rate of 0.25 ml/min. The core effluent pressure was maintained at 3000 psi. Approximately 80% of the oil was ultimately recovered from the Berea core. $CO_2$ breakthrough occurred at approximately 0.12 PVI, and after $CO_2$ breakthrough the pressure drop decreased slowly from 10 psi to 6 psi with 2 additional PVI of $CO_2$.

When the displacement was repeated with a Berea sandstone core of 30.4 mD using a solution of 1 wt % PFA in $CO_2$, $CO_2$ breakthrough was delayed until 0.44 PVI, and the ultimate oil recovery reached 95%. Such observations may be, for example, be attributable to increased $CO_2$ viscosity and changes in rock wettability. Such a substantial increase in oil recovery and delay in $CO_2$ breakthrough were promising mobility control results for PFA-$CO_2$ solutions. However, the increase in pressure drop was much larger than would be anticipated based solely on the four-fold increase in $CO_2$ viscosity with PFA thickening. At the end of the test the pressure drop across the core was 160 psi. If the viscosity increase was the only effect on pressure drop, the maximum increase should have been roughly four-fold, or 24 psi. Further, more of the pore space was filled with a $CO_2$-rich phase as the experiment ended. One would thus expect the relative permeability of $CO_2$ would have increased. However, the 160 psi pressure drop at the end of $CO_2$-PFA solution displacement was indicative that some of the PFA may have precipitated within the pore volume as a result the presence of light alkanes (a proven anti-solvent for PFA) in the $CO_2$. In addition, PFA adsorption is believed to have significantly reduced the permeability of the core. The pressure drop is unacceptable for mobility control because the incremental recovery and delayed gas breakthrough would be gained, but at the cost of an excessively high pressure drop and severe injectivity problems.

The results of the PFA-$CO_2$ solutions in displacing $CO_2$, brine and oil indicated that such solutions were unsuitable for mobility control. It is highly likely that injectivity problems would be experienced as a result of polymer retention within the porous media and polymer precipitation would occur in zones were the PFA-$CO_2$ solution mixed with oil. The prospects of using these PFA-$CO_2$ solutions for conformance control were, however, further evaluated. In these tests the objective was to determine if the permeability of a porous medium representative of a thief zone could be reduced sufficiently that flow of $CO_2$ could be diverted to other parallel, lower permeability layers. In a number of studies, $CO_2$ (or a PFA-$CO_2$ solution) was used to displace synthetic brine (4 wt % KCl) from brine-saturated cores listed in Table 1 above. Tests were conducted with individual cores as described above. Displacements were also conducted using dual parallel cores with significantly different permeability values, with the higher permeability core was representative of the thief zone.

In a representative study for $CO_2$ displacement from a Carbon Tan sandstone core that was initially saturated with brine, the $CO_2$ was injected at a constant rate of 1.00 ml/min, which corresponded to a superficial velocity of about 4 ft/day. The injection of $CO_2$ resulted in $CO_2$ breakthrough at about 0.3 PVI and an ultimate recovery of 40.3% of the brine in the core. The pressure drop, which peaked at about 135 psi slightly after breakthrough, fell quickly and then gradually approached about 16 psi after 4.5 PVI $CO_2$, as the effective permeability of the core to $CO_2$ at this point was 3.5 mD. Subsequently, brine was injected into the core until steady state was achieved and the final effective permeability of the core to brine reached 2.5 mD.

Another displacement was then conducted in a similar Carbon Tan sandstone to assess the effect of PFA dissolved in the $CO_2$. Initially about 4 PV $CO_2$ was injected into the brine-saturated core until brine recovery had reached its ultimate value of 38.3%. Then 8 PV of PFA-$CO_2$ solution (1 wt % PFA-$CO_2$) was introduced to the core. Although the percentage of brine recovery increased from 38.3% to 40.8%, the PFA-$CO_2$ solution dramatically increased the pressure drop from 9 psi at the end of the pure $CO_2$ flood to ~350 psi. The subsequent re-introduction of pure $CO_2$ resulted in the pressure drop falling to only 270 psi, corresponding to a reduction in the effective permeability to $CO_2$ from 7.3 mD at the beginning of the test to 0.24 mD after the introduction of the PFA-$CO_2$ solution (a 30-fold reduction). After that the core was flooded with brine until a steady state effective permeability to water of $K_{e,w}$=3.2 mD was attained at Sw 66.5%.

It became apparent that when sandstone cores are initially brine-saturated, a small amount of additional brine is recovered from the cores as a result of the increased viscosity and change in wettability. However, very significant increases in pressure drop (~30-fold) occur in sandstone. This result indicates that there may be injectivity problems to overcome associated with very high permeability reductions in the near wellbore area when a PFA-$CO_2$ solution is injected into a brine-saturated sandstone. Nonetheless, the studies provide further indication that PFA-$CO_2$ solutions can displace a variety of fluids (both gaseous and liquid) when use in altering wettability and/or fluid transport properties of a material.

Similar experiments were conducted in a 70 mD Indiana Limestone core, which demonstrated that a larger increase in incremental brine recovery occurred (5.8%) and much smaller increases in pressure drop. The effective permeability to $CO_2$ was reduced by a factor of only 1.6 as a result of the injection of PFA-$CO_2$ solution. These results are consistent with a higher degree of viscosity enhancement and a lower degree of PFA adsorption in limestone. A material balance of PFA for this displacement indicated that about 2.4 grams of PFA was retained by the core during the injection of 7 PV of a PFA-in-$CO_2$ solution (that started as a 1 wt % PFA solution at the beginning of the test that was diluted to a 0.44 wt % PFA solution at the end of the test) was retained by the core. These 2.4 gr PFA represented 77% of the 3.2 gr PFA that flowed into the core. Without limitation to any mechanism, high-pressure $CO_2$ leads to a pH below 3.0 in the presence of water and causes the solubility of calcium carbonate to rise significantly. Lower absorption may occur because the calcium carbonate surface upon which the PFA may be adsorbing is eroded by the low pH $CO_2$/brine mixture. Visual observations of erosion of limestone faces provided a qualitative indication that the erosion of limestone by carbonic acid is not completely prevented by the adsorption of PFA.

Once again, various strategies for optimizing conformance control were also tested using dual parallel cores that represented a high-permeability, thief-zone core and a low-permeability core representing the zone into which the $CO_2$ was to be diverted. An objective was to determine an optimal technique for treating the core(s) with the PFA-$CO_2$ solution such that the subsequently injected $CO_2$ would be diverted to the lower permeability core to displace as much brine as possible. During a control test using pure $CO_2$ with no PFA, both cores were first saturated with brine. In some cases, both cores were simultaneously flooded with $CO_2$ immediately after they were saturated with brine. In other cases, the high-permeability core was then isolated and flooded with many PV of $CO_2$ to replicate many years of $CO_2$ entering the high-permeability zone and to enhance its permeability to $CO_2$. Subsequently, $CO_2$ was simultaneously introduced to both parallel cores. The $CO_2$ was injected at a constant rate of 0.25 ml/min. The tests were conducted using cores that were initially saturated with brine. No oil was used. Nonetheless, the experiments were able to demonstrate whether flow could be diverted from a PFA-treated "thief zone" core into another lower permeability core.

In some cases, the 1 wt % PFA-in-$CO_2$ solution was then injected into both parallel cores, while in other experiments the PFA-$CO_2$ solution was introduced only into the isolated high-permeability, thief-zone core. Pure $CO_2$ was then injected in a manner that allowed flow into both parallel cores. Brine recovery from each core was measured.

The best strategy for conformance control was to introduce the 1% PFA in $CO_2$ solution only into the isolated high-perm core. In this manner, there was no chance of undesirable permeability reduction in the lower permeability core. After the conformance control treatment of the thief zone was complete, the subsequently injected high-pressure $CO_2$ was permitted to flow into both the PFA-treated thief zone and the lower permeability core.

In a control study, a brine-saturated, high-permeability Berea core was first isolated and then $CO_2$-flooded (2 PVI). In the dual core experiments, 1 PV corresponded to the combined pore volume of both cores. All of the recoverable water (about 30% of the total amount of brine in both cores) was displaced from that high-permeability Berea sandstone core. The Berea core, which represented a thief zone that had been extensively flooded with $CO_2$, was then placed in parallel with a lower permeability brine-saturated Carbon Tan sandstone. The parallel cores were then subjected to the simultaneous introduction of $CO_2$. None of the $CO_2$ entered the Carbon Tan core; all of the $CO_2$ entered the Berea core. Therefore, there was no additional recovery of brine.

The pressure drop for this experiment decreased from 4 psi to 2 psi during the injection of $CO_2$ into the isolated Berea core, and then gradually decreased to 1 psi when the cores were placed in parallel for continued $CO_2$ injection. The pressure drop data for the first 2 PVI (that only entered the Berea core) is consistent with that measured for a single brine-saturated Berea core.

In another study a 1 wt % PFA-$CO_2$ solution was injected into the isolated, brine-saturated thief zone (the high-permeability Berea). Once again, by the time that 2 PVI of PFA-$CO_2$ solution had been introduced to the isolated Berea core, all of the recoverable brine had been displaced from the isolated Berea core. The brine was equivalent to approximately 40% of the total brine in both cores. The Berea core was then placed in parallel with the brine-saturated lower permeability Carbon Tan core and the cores were flooded with $CO_2$. All of the $CO_2$ was diverted away from the Berea core into the Carbon Tan core, resulting in the recovery of all of the recoverable brine from the Carbon Tan core. This represented an ideal diversion result in that the 1 wt % PFA-in-$CO_2$ solution reduced the permeability of the Berea core so effectively that none of the subsequently injected $CO_2$ entered that treated Berea core. Once again, all of the subsequently injected $CO_2$ was successfully diverted to the Carbon Tan core. The pressure drop data for the conformance control experiment showed an increase in pressure drop during the injection of the 2 PV of the 1 wt % PFA-in-$CO_2$ solution into the isolated brine-saturated Berea core A dual carbonate core displacement experiment was also conducted in a slightly different manner that allowed the control experiment to be followed by the conformance control experiment using the same cores. An Indiana Limestone core was isolated and flooded with $CO_2$, resulting in the recovery of 20% of the total brine in both cores; which corresponds to about 40% of the brine in the Indiana Limestone. Both cores were then placed in parallel and $CO_2$ was permitted to flow into both cores. About 4% of the total brine was then recovered from the Edwards Yellow Limestone, which corresponds to about 8% of the brine in the Edwards Yellow Limestone. No further brine was recovered from the Indiana Limestone. However, $CO_2$ was flowing through both cores. The Indiana Limestone was again isolated to inject the 1 wt % PFA-$CO_2$ solution. A small amount of incremental brine (approximately 1%) was recovered from the Indiana Limestone during the injection of the PFA-$CO_2$ solution. $CO_2$ was then allowed to flow into both parallel cores. During this phase of the displacements, the brine recovery from the Edwards Yellow Limestone increasing by approximately 2% of the total brine (approximately 4% of the brine in the Edwards Yellow Limestone). No additional brine was recovered from the Indiana Limestone. It is apparent that, because only 2% of the brine was recovered after 2 PV (based on both cores) of $CO_2$ injection, a significant portion of the $CO_2$ was still flowing through the Indiana Limestone. If the $CO_2$ been diverted completely to the Edwards Yellow core, the rate of brine recovery would have been faster and incremental amount of brine recovery would have reached about 20% rather than only 2%. In terms of conformance control, the results for dual parallel limestone cores were not as promising as the results with sandstone.

The compositions and methods hereof one to change the wettability of the surfaces of materials and to significantly reduce fluid transport (for example, reduce permeability) through such materials. The present compositions are believed to be the first and only known $CO_2$-soluble proposed for conformance control in $CO_2$-based enhanced oil recovery projects. All other known conformance control agents for $CO_2$ enhanced oil recovery (EOR) are water-based polymer solutions that tend to flow into the rock where water most readily flows. Although change is surface and fluid transport properties have been discussed din connection with materials/formations present in subterranean hydrocarbon recover processes, on skilled in the art appreciates that the systems, methods and compositions hereof are applicable to a wide range of other materials.

Experimental

Synthesis of High Molecular Weight, $C_6F_{13}$-Based Polyfluoroacrylate.

A glass column is filled at the narrow end with a small amount of cotton wool, and then with inhibitor remover up to three quarters of the length of the column (Sigma Aldrich #306312, Inhibitor Remover to remove monomethyl ether hydroquinone). The column is held vertically upright with a clamp and stand—with the cotton wool at the bottom. The following step was done with dry nitrogen being passed over the top and exit of the glass column, by using a Schleck manifold to direct nitrogen through two lines. It can also be done inside a glove box or glove bag. Fluoroacrylate monomer 2-(perfluorohexyl)ethyl acrylate was passed through the vertical inhibitor remover column, to remove the inhibitor and prepare the monomer for reaction. The monomer was added in portions to the top of the vertical column from the bottle and the monomer was collected in a glass flask beneath the column. Once enough monomer has been collected, estimated by using density and having a graduated receiving flask, the flask is sealed.

In an inert gas filled glove box or glove bag, 30.0 g of monomer ($CH_2$=$CH[COOC_2H_4C_6F_{13}]$) fluoroacrylate (MW 418; 0.0239 mol) and 0.0002 g re-crystallized AIBN initiator (Sigma Aldrich #755745), (0.002 wt % of mass of monomer) were weighed out and added to a pressure vial (Ace Glassware #8648-96). Once the addition of the monomer and initiator were completed a small magnetic stir bar was added. The vial was subsequently sealed under nitrogen inside the glove box/glove bag, by screwing on the lid.

The reaction vial was then removed from the glove bag/glove box, and placed into an oil bath. The oil bath used was a tall, large volume Pyrex beaker (750 ml). The pressure vial was held in place using clamps almost completely submerged in a silicone oil bath resting on a hotplate with rotating magnet. The vial was heated to 75° C. for 12 hours while the stir bar was rotating at a speed of 600+ rpm. After the 12 hour time had elapsed, the reaction was allowed to cool to ambient temperature.

The pressure vial was opened and the polymer product and un-reacted monomer, was observed to form a sticky, clear mixture, which is a very tough, almost gum like gel. 50 ml of HFE-7100 was added to the vial with the polymer still inside. More HFE-7100 can be added, but the vial should not be more than 800/% full. The polymer is left to soften in the solvent for 30 minutes, before a steel spatula is used to loosen and break up the polymer in the vial. The vial is then re-sealed, placed back in the oil bath, and heated to 85° C. for 15-20 minutes. After this, the vial is removed again, and left in a rack to cool for 5 to 10 minutes.

After cooling the vial is cracked open slowly, until pressure is relieved, and the HFE-7100 with some dissolved polymer can be decanted into a clean glass beaker. During the steps of this paragraph and the previous paragraph, some of the homopolymer is removed from the main homopolymer gel slug and dissolved into the HFE-7100 solvent, but it is a slow process as a result of the relative weakness of HFE-7100 as a solvent for the high MW homopolymer. To dissolve more polymer into the solvent (to minimize solvent use) you can open the vial (after allowing it cool), and again use a steel spatula to loosen and mix the polymer into the solvent, before returning the resealed vial back to the oil bath for another 20 minutes. The steps of this paragraph and the previous paragraph may be repeated with as much solvent as is required. Typically, about 500 ml of HFE-7100 is needed and 8-10 hours of time to heat, dissolve and cool. It can be collected and recycled with a distillation set-up if required (separate process). Heating the polymer inside the sealed pressure vial is required to not use inordinate quantities of solvent and time trying to dissolve the homopolymer cold. This is because by partially melting the polymer it is able to dissolve much faster.

Once dissolution of the product was achieved, the HFE-7100/polymer solution was added to 600 ml of methanol to precipitate the polymer product whilst leaving unreacted monomer dissolved in the bulk solvent phase. The solid, sticky polymer was collected from the bottom of the beaker using a spatula, and transferred to a wide Pyrex beaker. This Pyrex beaker was placed on the hotplate for drying at 65° C., and covered with a large glass Petri dish, the beaker spout allowing methanol vapor to escape. (A vacuum oven could also be used, however the polymer will bubble up and expand and possibly escape its container). The polymer is left to dry in the beaker at 65° C. for 3 to 4 hours, as necessary. The polymer will be dry when its consistency has changed from a gooey solid to a very elastic, but tough waxy solid. When the homopolymer is still warm it is best to roll the polymer into a ball and slowly remove it from the glass beaker rather than trying to rip it off the glass or scrape it off with a spatula. It will initially be very firmly stuck to the glass so patience is required. Eventually the polymer will form a tacky ball which can be easily pulled out of the beaker (or wide mouthed glassware), and placed into a wide mouthed screw top container. Once cool, the polymer is considerably more plastic in consistency and behavior, and is a clear extremely sticky, elastic polymer. The polymer exhibited a glass transition temperature of 6° C. and a weight-average molecular weight in the range of approximately 300,000 to 500,000.

The polymer hereof may, for example, be synthesized via radical polymerization or Reversible-Deactivation Radical Polymerization (RDRP; formerly referred to as Controlled Radical Polymerization or CRP) procedures, include, for example, Nitroxide Mediated Polymerization (NMP), Atom Transfer Radical Polymerization (ATRP), and Reversible Addition Fragmentation Transfer (RAFT) and others (including cobalt mediated transfer) that have evolved over the last two decades. RDRP provide access to polymer and copolymers comprising radically polymerizable/copolymerizable monomers with predefined molecular weights, compositions, architectures and narrow/controlled molecular weight distributions. RDRP have emerged as valuable techniques for synthesizing well-defined methacrylate/acrylate-based polymer materials with various architectures including linear polymers, and hybrid materials with inorganic solids or biomolecules.

Because RDRP processes can provide compositionally homogeneous well-defined polymers, with predicted molecular weight, narrow/designed molecular weight distribution, and high degrees of α- and ω-chain end-functionalization, they have been the subject of much study, as reported in several review articles and ACS symposia. See, for example, Qiu, J.; Charleux, B.; Matyjaszewski, K., *Prog. Polym. Sci.* 2001, 26, 2083; Davis, K. A.; Matyjaszewski, K. *Adv. Polym. Sci.* 2002, 159, 1; Matyjaszewski, K., Ed. Controlled Radical Polymerization; ACS: Washington, D.C., 1998; ACS Symposium Series 685. Matyjaszewski, K., Ed.; Controlled/Living Radical Polymerization. Progress in ATRP, NMP, and RAFT; ACS: Washington, D.C., 2000; ACS Symposium Series 768; and Matyjaszewski, K., Davis, T. P., Eds. Handbook of Radical Polymerization; Wiley: Hoboken, 2002, the disclosures of which are incorporated herein by reference.

Viscosity of PFA in $CO_2$.

The viscosity of single-phase solutions of 1 wt % PFA and 99 wt % $CO_2$ at 25° C. was determined using falling object (cylinder) viscometry. In these devices, the fluid and the object are retained within a closed cylindrical space, and as the object falls, the displaced fluid flows upward around the object in the gap between the object and the inner wall of the cylinder. The details of this procedure and the derivation of the expressions for the viscometer constant, shear rate, fluid velocity profile in the annulus, pressure drop along the annulus, and fluid viscosity have been previously detailed for a high pressure falling cylinder (Heller & Taber, 1982) (Barrage, 1985) (Xu, 2003), and a falling ball (Dhuwe, et al., 2016). The governing expression for a falling object viscometer is $$\mu = \frac{K*(\rho_c - \rho_l)}{Vc_t} \quad (2)$$

where μ is viscosity (cp, or mPa s), $\rho_c$ is the density of the aluminum cylinder (2.70 g/cm$^3$), $\rho_t$ is the density of the $CO_2$ or $CO_2$-rich liquid (g/cm$^3$), $Vc_t$ is the terminal velocity of the falling object (cm/s), and K is the viscometer constant (mPa cm$^4$ g$^{-1}$). In the case of a falling ball, the calibration constant K can only be determined reliably via calibration. Further, there is a wide range of shear rates associated with the surface of the ball (Dhuwe, et al., 2016). If a falling cylinder is used, the viscometer constant can be derived for Newtonian fluids solely from the geometry of the cylinder and tube as, where g=980 cm/s$^2$, $r_c$ is the radius of the aluminum cylinder (cm) and $r_t$ is the inner radius of the tube within which the cylinder falls (cm). The radius of the thick-walled Pyrex tube within which the cylinder falls, $r_c$, is 1.5875 cm. The radii of the three aluminum cylinders used in this study are 1.5809 cm, 1.5733 cm and 1.5657 cm. K is extremely sensitive to small variations in these dimensions, however. Therefore, K is typically determined via calibration with a fluid of known density and viscosity at the temperature and pressure of interest, namely pure $CO_2$. There is a single shear rate associated with a falling cylinder viscometer. The shear rate is not an independent variable, however; it can only be determined after one measures the terminal velocity of the cylinder. The shear rate at the surface of the falling cylinder is $$\frac{dV_z}{dr}\bigg|_{r=rc} = Vc_t \left[ \frac{-2r_c - (r_t^2 - r_c^2)\frac{1}{r_c \ln\left(\frac{r_c}{r_t}\right)}}{\ln\left(\frac{r_c}{r_t}\right)(r_t^2 + r_c^2) + (r_t^2 - r_c^2)} + \frac{1}{r_c \ln\left(\frac{r_c}{r_t}\right)} \right] \quad (1)$$

where $v_z$(cm/s) is the fluid velocity in the axial direction in the annular gap between the surface of the aluminum cylinder and the inner wall of the tube. In this study, the same procedure previously used to determine the $CO_2$-thickening capability of polyFAST was used (Huang, et al., 2000), with the exception that the polymer used in the current study is PFA. A close-clearance aluminum cylinder was placed within a thick-walled Pyrex tube that housed the cylindrical sample volume of the Schlumberger variable-volume, windowed, agitated cell. $CO_2$ was then added to the cell, which was maintained at a constant temperature within an air bath. The cell was rapidly inverted and the terminal velocity of the falling cylinder was determined by measuring the time required for the ball to fall a specified distance. The viscometer constant was then determined and the corresponding shear rate was calculated. This test was repeated with mixtures of 1 wt % PFA in $CO_2$ at pressures above the cloud point pressure to ensure that a single phase solution would be attained within the sample volume. It was assumed that the density of the fluid was approximately equal to the density of $CO_2$ at the same temperature and pressure. Further, it was assumed that the dilute solution of PFA in $CO_2$ was Newtonian. Although the governing expressions for falling cylinder viscometry for non-Newtonian fluids have been previously derived (Ashare, Bird, & Lescarboura, 1965) it was not practical to obtain enough high pressure data to develop an accurate non-Newtonian model of the $CO_2$-PFA solutions. Under this set of assumptions, if the same cylinder fell three times more slowly in the PFA-$CO_2$ solution than it did in $CO_2$ at the same temperature and pressure, then the solution was estimated to be three times as viscous as pure $CO_2$. This process was repeated for two other cylinders with slightly varying diameter, which affected both $r_c$ and $V_{ct}$, in order to estimate the effect of $$K = \frac{r_c * g}{\frac{-4r_c}{\ln\left(\frac{r_c}{r_t}\right)(r_t^2 + r_c^2) + (r_t^2 - r_c^2)} - 2\left(\frac{-2r_c - (r_t^2 - r_c^2)\frac{1}{r_c \ln\left(\frac{r_c}{r_t}\right)}}{\ln\left(\frac{r_c}{r_t}\right)(r_t^2 + r_c^2) + (r_t^2 - r_c^2)} + \frac{1}{r_c \ln\left(\frac{r_c}{r_t}\right)}\right)} \quad (1)$$

shear rate on solution viscosity. We recognize that equations 2 and 3 were derived for Newtonian fluids and that the $CO_2$-PFA solution is likely to be slightly non-Newtonian (Xu, Walschin, & Enick, 2003). However, the objective of these measurements was to provide an approximation of how much "thicker" (i.e. more viscous) the $CO_2$-PFA was than pure $CO_2$ at low shear rates; especially the lowest shear rates where the solution would be expected to behave in a more Newtonian fashion. It was not our intent to develop precise models of the non-Newtonian nature of high pressure dilute polymer solutions over a wide range of shear rates.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of treating a material to achieve at least one of reducing surface wettability of the material or reducing fluid transport through the material, comprising: exposing the material to a composition comprising a solution of a polymer portion and carbon dioxide for a period of time, the polymer portion comprising at least one of a polyfluoroacrylate or a copolymer of a fluoroacrylate and a comonomer, wherein a pressure of the composition is maintained above the cloud point of the polymer portion at a concentration thereof in the carbon dioxide for the period of time.

2. The method of claim 1 wherein the comonomer is present in the copolymer up to 50 mole %.

3. The method of claim 1 wherein the comonomer is an alkyl acrylate, an alkyl methacrylate, styrene, benzyl acrylate, phenyl acrylate, napthyl acrylate, cyclohexyl acrylate lauryl acrylate, or a mixture thereof.

4. The method of claim 1 wherein the cloud point is no more than 5000 psi.

5. The method of claim 1 wherein the polymer portion consist of polyfluoroacrylate polymers.

6. The method of claim 5 wherein the concentration of polyfluoroacrylate in the carbon dioxide is in the range of 0.01% to 20 wt %.

7. The method of claim 5 wherein the concentration of polyfluoroacrylate in the carbon dioxide is in the range of 0.5% to 2 wt %.

8. The method of claim 6 wherein the cloud point is no more than 2000 psi.

9. The method of claim 5 wherein the cloud point is no more than 1500 psi.

10. The method of claim 6 wherein the material comprises a cement.

11. The method of claim 10 wherein the cement is present in a well bore used in a hydrocarbon recovery process.

12. The method of claim 11 wherein the cement is positioned outside a well casing in the well bore.

13. The method of claim 11 further comprising isolating the cement to be treated before exposing the cement to the composition.

14. The method of claim 6 wherein the material is a subterraneous formation.

15. The method of claim 14 wherein the composition is used for conformance control.

16. The method of claim 14 wherein the composition is selectively injected into a high-permeability zone of a subterraneous formation.

17. The method of claim 14 wherein the composition is used for reducing fluid transport through at least a portion of the subterraneous formation subsequent to injection of carbon dioxide for sequestration of the carbon dioxide in the subterraneous formation.

18. A system for treating a material to achieve at least one of reducing surface wettability of the material or reducing fluid transport through the material, comprising: a container including a solution of a polymer portion and carbon dioxide, the polymer portion comprising at least one of a polyfluoroacrylate polymer or a copolymer of a fluoroacrylate and a comonomer, the container comprising an outlet from which the composition is injected, the system further comprising a pressurizing mechanism to inject the solution from the outlet of the container at a pressure above the cloud point of the polymer portion.

19. The system of claim 18 further comprising an isolating system to limit the flow of the composition to a predetermined volume during injection of the composition into a well bore.

20. The system of claim 19 wherein the isolating system comprises straddle packer system.

21. A method of treating a material to achieve at least one of reducing surface wettability of the material or reducing fluid transport through the material, comprising: exposing the material to a composition comprising a solution of a polymer portion which is oleophobic, hydrophobic or multiphobic and carbon dioxide for a period of time, wherein a pressure of the composition is maintained above the cloud point of the polymer portion at a concentration thereof in the carbon dioxide for the period of time.

22. The method of claim 21 wherein the polymer portion comprises at least one of a polyvinyl acetate, a polydimethyl siloxane, a polyfluoroacrylate or a copolymer of fluoroacrylate and a comonomer.

23. The method of claim 21 wherein the cloud point is no more than 5000 psi.

24. The method of claim 21 wherein the cloud point is no more than 2000 psi.

* * * * *